United States Patent
Yamada et al.

(10) Patent No.: US 10,551,599 B2
(45) Date of Patent: Feb. 4, 2020

(54) SOFT FOCUS OPTICAL SYSTEM, SOFT FOCUS ADAPTER, SOFT FOCUS LENS, AND IMAGE PICKUP APPARATUS

(71) Applicant: CANON KABUSHIKI KAISHA, Tokyo (JP)

(72) Inventors: Tomoya Yamada, Utsunomiya (JP); Yonghee Lee, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/000,184

(22) Filed: Jun. 5, 2018

(65) Prior Publication Data

US 2018/0356617 A1 Dec. 13, 2018

(30) Foreign Application Priority Data

Jun. 9, 2017 (JP) .................. 2017-114128

(51) Int. Cl.
| | |
|---|---|
| *G02B 13/20* | (2006.01) |
| *G02B 7/14* | (2006.01) |
| *G02B 9/64* | (2006.01) |
| *G02B 13/18* | (2006.01) |

(52) U.S. Cl.
CPC .............. *G02B 13/20* (2013.01); *G02B 7/14* (2013.01); *G02B 9/64* (2013.01); *G02B 13/18* (2013.01)

(58) Field of Classification Search
CPC .. G02B 5/0278; G02B 5/0221; G02B 5/0242; G02B 5/0226; G02F 1/133504

USPC ......................................................... 359/707
See application file for complete search history.

(56) References Cited

U.S. PATENT DOCUMENTS

| | | | | |
|---|---|---|---|---|
| 2007/0217030 A1* | 9/2007 | Muramatsu | ............ | G02B 13/04 359/708 |
| 2010/0157106 A1* | 6/2010 | Morooka | ............ | G02B 15/177 348/240.3 |
| 2016/0124199 A1 | 5/2016 | Sanjo et al. | | |
| 2016/0187628 A1 | 6/2016 | Sanjo et al. | | |
| 2016/0209726 A1* | 7/2016 | Kanai | ................... | G03B 13/08 |

FOREIGN PATENT DOCUMENTS

| | | |
|---|---|---|
| JP | H0273321 A | 3/1990 |
| JP | H09179023 A | 7/1997 |
| JP | H09189858 A | 7/1997 |
| JP | 2004301883 A | 10/2004 |

\* cited by examiner

*Primary Examiner* — Mohammed A Hasan
(74) *Attorney, Agent, or Firm* — Carter, DeLuca & Farrell LLP

(57) ABSTRACT

Provided is a soft focus optical system configured to be arranged on an image side of an image pickup optical system, the soft focus optical system consisting of a negative lens and a positive lens, in which a conditional expression 0.950<B<1.050 is satisfied, where B is a magnification of the soft focus optical system, and in which a conditional expression, $|(2Y)^2/(fn \times fp)| \le 0.005$ is satisfied or conditional expressions, $0.005 < |(2Y)^2/(fn \times fp)|$; and $fn/fp < -0.750$ are satisfied, where fn is a focal length of the negative lens, fp is a focal length of the positive lens, and Y is a maximum image height of the image pickup lens.

13 Claims, 32 Drawing Sheets

SOFT FOCUS OPTICAL SYSTEM, SOFT FOCUS ADAPTER, SOFT FOCUS LENS, AND IMAGE PICKUP APPARATUS

BACKGROUND OF THE INVENTION

Field of the Invention

The present invention relates to a soft focus optical system, a soft focus adapter, a soft focus lens, and an image pickup apparatus.

Description of the Related Art

Hitherto, there has been known a lens that is capable of providing a so-called soft focus effect (soft focus lens) as a lens for television broadcasting, a digital camera, or a lens for digital cinema. This is a lens in which performance in a center portion of an image area of an object image is changed to provide a depiction property that is different from that of a lens for normal photography that is capable of sharp depiction (sharp focus lens or non-soft focus lens). In general, the lens for television broadcasting or digital cinema has high optical performance for the performance at the center (spherical aberration) and high contrast, and hence has a clear contour of an object in many cases. In contrast, in fields of television broadcasting and digital cinema, in order to emphasize a main object, a depiction property for the performance at the center (spherical aberration) may be evaluated in aesthetic terms in some cases.

In Japanese Patent Application Laid-Open No. H09-179023, there is disclosed a configuration for realizing a soft focus lens. In order to realize the soft focus lens, a lens is formed by arranging, in order from an object side, a front lens unit having a negative power and a rear lens unit including a stop and having a positive power, to thereby realize a soft focus lens of a wide-angle system.

In Japanese Patent Application Laid-Open No. 2004-301883, in an optical system of a normal photographic lens, a lens forming a part of the optical system is replaced by an aspherical lens having an aspherical portion having a convex power in a peripheral portion thereof to realize a soft focus lens.

In Japanese Patent Application Laid-Open No. H09-189858, there is disclosed a configuration regarding an attachment lens having an aberration varying function. The above-mentioned attachment lens is attached on an image side of a zoom lens or a fixed focal length lens. The attachment lens has a two-unit configuration as a whole, and is set to have high spherical aberration sensitivity to a change in interval between the first lens unit and the second lens unit. In the configuration, at least one of a plurality of lens units is moved as a spherical aberration adjusting lens unit in an optical axis direction.

In Japanese Patent Application Laid-Open No. H02-73321, there is adopted a configuration in which a soft focus filter having an aberration varying function is arranged on an optical axis between an image forming lens and an image plane, and is displaced in an optical axis direction to achieve a desired soft focus effect.

As in Japanese Patent Application Laid-Open No. H09-179023, in order to obtain a photographic lens that is capable of soft-focus depiction, it is common to perform lens design as a separate procedure. In other words, in the related art, in order to design and manufacture lenses having different uses of photography, different design procedures and special manufacturing steps are required. Therefore, there have been contradicting problems in that designing and manufacturing photographic lenses having different uses lead to a large increase in cost, and in that a reduction in cost accompanies a decrease in number of lenses, and hence sacrifices lens performance.

With the soft focus lens described in Japanese Patent Application Laid-Open No. 2004-301883, the lens for normal photography and the soft focus lens are partially used in common, but an aspherical surface is added to realize the soft focus lens. The addition of the new aspherical surface is highly difficult in manufacturing and significantly increases processing cost. Moreover, when the aspherical lens is added, axial deviation sensitivity is increased, and hence an assembling difficulty is also increased.

In the attachment lens of Japanese Patent Application Laid-Open No. H09-189858, a combined focal length of an image forming lens and the attachment lens is changed. Therefore, there is a problem in that the attachment lens cannot be used without changing a focal length of the image forming lens.

In a method of Japanese Patent Application Laid-Open No. H02-73321, there is used, as soft focusing means, a filter obtained by distributing two-dimensionally and at random small openings having a phase difference from a part other than the openings. When such filter is used, there is a problem in that it is difficult to accurately control spherical aberration and obtain the desired effect.

SUMMARY OF THE INVENTION

The present invention provides, for example, a soft focus optical system advantageous in causing an optical element to be in common between a sharp focus lens and the soft focus lens.

According to one embodiment of the present invention, there is provided a soft focus optical system configured to be arranged on an image side of an image pickup optical system, the soft focus optical system consisting of a negative lens and a positive lens, in which a conditional expression, $$0.950 < B < 1.050,$$

is satisfied, where B is a magnification of the soft focus optical system, and in which a conditional expression, $$|(2Y)^2/(fn \times fp)| \leq 0.005$$

is satisfied or conditional expressions, $$0.005 < |(2Y)^2/(fn \times fp)|; \text{ and}$$

$$fn/fp < -0.750,$$

are satisfied, where fn is a focal length of the negative lens, fp is a focal length of the positive lens, and Y is a maximum image height of the image pickup lens.

Further features of the present invention will become apparent from the following description of exemplary embodiments with reference to the attached drawings.

DESCRIPTION OF THE EMBODIMENTS

Figure 1:
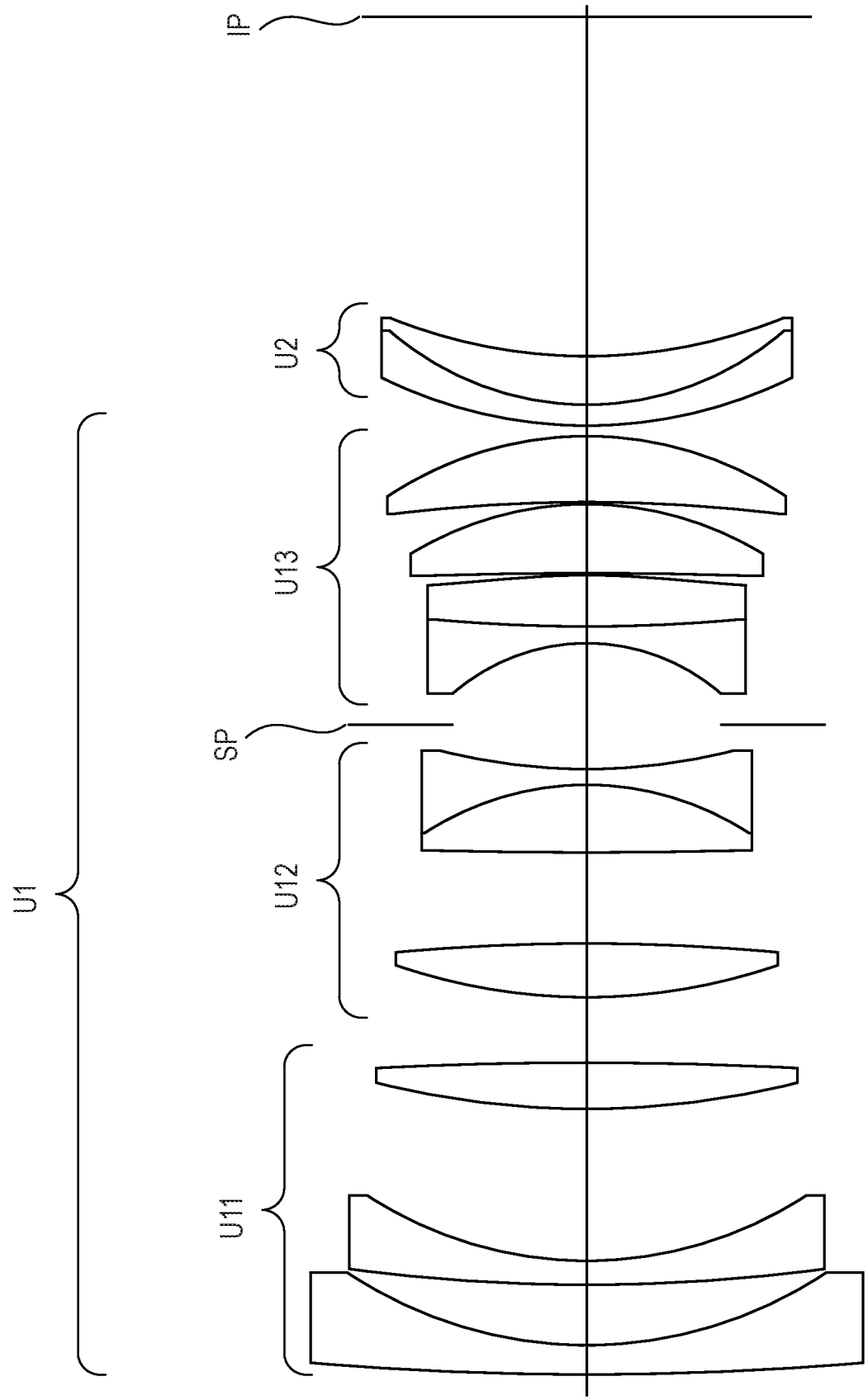
FIG. 1 is a cross-sectional view of a soft focus lens according to Embodiment 1 of the present invention when in focus at an infinite distance.

Preferred embodiments of the present invention will now be described in detail in accordance with the accompanying drawings.

Now, features of each of Embodiments of the present invention are described.

A soft focus optical system according to one embodiment of the present invention is used by being arranged on an image side of an image pickup optical system (image pickup lens) to give a soft focus effect on an optical image formed by the image pickup optical system. When a magnification of the soft focus optical system according to one embodiment of the present invention is represented by B, the following conditional expression (1) is satisfied.

$$0.950 < B < 1.050 \qquad (1)$$

The conditional expression (1) is defined to substantially match, when the soft focus optical system according to one embodiment of the present invention is used by being arranged on the image side of the image pickup optical system, a focal length of the image pickup optical system and a combined focal length of the image pickup optical system and the soft focus optical system. When the upper limit condition or the lower limit condition of the conditional expression (1) is not satisfied, the focal length of the image pickup optical system and the combined focal length of the image pickup optical system and the soft focus optical system are significantly changed from each other.

It is more preferred to set the conditional expression (1) as follows:

$$0.955 < B < 1.045 \qquad (1a).$$

It is further preferred to set the conditional expression (1) as follows:

$$0.980 < B < 1.020 \qquad (1b).$$

When a focal length of the above-mentioned one negative lens is represented by "fn", a focal length of the above-mentioned one positive lens is represented by "fp", and a maximum image height of the above-mentioned image pickup lens is represented by Y, the soft focus optical system according to one embodiment of the present invention satisfies the following conditional expression (2):

$$|(2Y)2/(fn \times fp)| \leq 0.005 \qquad (2),$$

or when $0.005 < |(2Y)2/(fn \times fp)|$, the following conditional expression (3):

$$fn/fp < -0.750 \qquad (3).$$

The "maximum image height of the image pickup lens" as used herein refers to a maximum image height (half (radius of) the image circle) that determines a half angle of view of the image pickup lens.

The conditional expression (2) defines the focal lengths of the lenses of the soft focus optical system. When the conditional expression (2) is satisfied, refractive powers of the lenses become weaker, and curvatures of a surface on an object side and a surface on the image side become closer to each other in each lens. As a result, in each lens, the surfaces have the same level of inclination angles with respect to a principal ray of an off-axial ray, and hence spherical aberration and various aberrations generated by the surfaces cancel each other, with the result that occurrences of comatic aberration and curvature of field can be suppressed.

The conditional expression (3) defines a ratio between the focal lengths of the lenses of the soft focus optical system. When the lenses have certain degrees of focal lengths or more, the refractive powers of the lenses become stronger, and the curvatures of the surface on the object side and the surface on the image side become more separated from each other in each lens. As a result, in each lens, the surfaces have different inclination angles with respect to the principal ray of the off-axial ray, and hence it becomes difficult to cancel the spherical aberration and the various aberrations generated by the surfaces, and hence to suppress the occurrences of the comatic aberration and the curvature of field. In this case, when the refractive powers of the positive lens and the negative lens are set closer to each other such that a ratio between the refractive powers is around −1, off-axial aberrations generated by the negative lens can be corrected by the positive lens.

When neither the upper limit condition of the conditional expression (2) nor the upper limit condition of the conditional expression (3) is satisfied, canceling of various off-axial aberrations between the negative lens and the positive lens is disadvantageously reduced.

It is more preferred to set the conditional expression (3) as follows:

$$fn/fp < -0.800 \qquad (3a).$$

It is further preferred to set the conditional expression (3) as follows:

$$fn/fp < -0.830 \qquad (3b).$$

The image pickup optical system (image pickup lens) to be arranged on the object side of the soft focus optical system according to one embodiment of the present invention when the soft focus optical system is used is a lens for normal photography, which is configured to perform sharp depiction, and in which the aberrations are satisfactorily corrected. When a spherical aberration amount at 100 percent of ray height with respect to a d-line in an in-focus state at an infinite distance is represented by SA, and an F-number of the image pickup lens is represented by Fno, the image pickup optical system satisfies the following conditional expression (4):

$$|SA| \leq (2Y \times Fno) < 4.000 \times 10^{-3} \qquad (4).$$

The conditional expression (4) defines the image pickup optical system, and when the conditional expression (4) is satisfied, sharp depiction with reduced spherical aberration becomes possible.

When the upper limit condition of the conditional expression (4) is not satisfied, it becomes disadvantageously difficult for the image pickup optical system to perform the sharp depiction.

It is more preferred to set the conditional expression (4) as follows:

$$|SA| \leq (2Y \times Fno) < 2.500 \times 10^{-3} \qquad (4a).$$

It is further preferred to set the conditional expression (4) as follows:

$$|SA| \leq (2Y \times Fno) < 1.500 \times 10^{-3} \qquad (4b).$$

The soft focus optical system according to one embodiment of the present invention consists of two lenses. This is a minimum configuration that is required to satisfy the conditional expression (1) while the aberrations of the image pickup optical system, to which the soft focus optical system is connected, are changed. When the conditional expression (1) is not satisfied, it becomes difficult to downsize or reduce weight of the soft focus optical system.

Moreover, as a further embodiment of the present invention, it is preferred that, in order to correct axial chromatic aberration and chromatic aberration of magnification, the soft focus optical system be a cemented lens obtained by cementing a negative lens and a positive lens.

Moreover, when curvature radii of the surfaces on the object side and the image side of the negative lens and curvature radii of the surfaces on the object side and the image side of the positive lens, which form the soft focus optical system according to one embodiment of the present invention, are represented by rn1, rn2, rp1, and rp2, respectively, it is preferred to satisfy the following conditional expressions (2), (5), and (6):

$$|(2Y)^2/(fn \times fp)| \leq 0.005 \qquad (2);$$

$$2.5 < |SFn| \qquad (5); \text{ and}$$

$$2.5 < |SFp| \qquad (6),$$

provided that:

$$SFn = (rn1 + rn2)/(rn1 - rn2); \text{ and}$$

$$SFp = (rp1 + rp2)/(rp1 - rp2).$$

The conditional expressions (5) and (6) define lens shapes (shape factors) of the lenses forming the soft focus optical system. The lenses forming the soft focus optical system include a negative lens and a positive lens. When the curvatures of the surface on the object side and the surface on the image side are close to each other in each lens, the surfaces have the same level of inclination angles with respect to the principal ray of the off-axial ray in each lens, and hence the spherical aberration and the various aberrations generated by the surfaces cancel each other, with the result that the occurrences of the comatic aberration and the curvature of field can be suppressed. When the conditional expressions (5) and (6) are satisfied, it becomes possible to suppress the occurrences of the off-axial aberrations and other various aberrations at the surfaces of the soft focus optical system. When the shape factors fall below the lower limit values of the conditional expressions (5) and (6), the refractive power becomes much stronger in each of the negative lens and the positive lens, with the result that it becomes difficult to suppress the occurrences of the off-axial aberrations, chromatic aberration, and other various aberrations.

It is more preferred to set the conditional expressions (5) and (6) as follows:

$$3.0 < |SFn| \quad (5a); \text{ and}$$

$$3.0 < |SFp| \quad (6a).$$

Moreover, in the negative lens and the positive lens, which form the soft focus optical system according to one embodiment of the present invention, when, of the positive lens and the negative lens, a curvature radius of a surface on the object side of a lens on the object side is represented by r1, and a curvature radius of a surface on the image side of a lens on the image side is represented by r4, and when $$0.005 < |(2Y)^2/(fn \times fp)|,$$

the surface on the object side of the lens on the object side is convex toward the object side, and the surface on the image side of the lens on the image side is convex toward the object side, and it is preferred to satisfy the following conditional expression (7):

$$6.5 < |SFnp| \quad (7),$$

provided that:

$$SFnp = (r1+r4)/(r1-r4).$$

The conditional expression (7) defines the lens shapes (shape factors) of the lenses forming the soft focus optical system. When the lenses have certain degrees of the focal lengths or more, it is required to cancel the various aberrations at the surfaces of the negative lens and the positive lens as the entire soft focus optical system. The curvature of the surface on the object side of the lens on the object side, which generates a large amount of aberrations, and the curvature of the surface on the image side of the lens on the image side have the same level of inclination angles with respect to the off-axial ray, and hence the various aberrations caused by the off-axial ray, which are generated by the surfaces, cancel each other at the surfaces, with the result that the occurrences of the off-axial aberrations can be suppressed.

Meanwhile, for an axial ray, when the surface on the object side of the lens on the object side is convex toward the object side and the surface on the image side of the lens on the image side is convex toward the object side, and the surfaces have the same level of curvature, the inclination angle of the surface on the image side of the lens on the image side, which generates undercorrected spherical aberration, becomes larger than the inclination angle of the surface on the object side of the lens on the object side, which generates overcorrected spherical aberration. Therefore, negative spherical aberration can be generated as the soft focus optical system.

When the shape factors fall below the lower limit value of the conditional expression (7), it becomes disadvantageously difficult to satisfactorily cancel the various aberrations at the surfaces of the negative lens and the positive lens as the entire soft focus optical system.

It is more preferred to set the conditional expression (7) as follows:

$$7.0 < |SFnp| \quad (7a).$$

Moreover, when a refractive index of a material of the negative lens with respect to the d-line is represented by Nn, and a refractive index of a material of the positive lens with respect to the d-line is represented by Np, it is preferred that the negative lens and the positive lens, which form the soft focus optical system according to one embodiment of the present invention, satisfy the following conditional expression (8):

$$0.740 < Nn/Np < 1.350 \quad (8).$$

The conditional expression (8) defines the refractive indices of the lenses forming the soft focus optical system. When the range of the conditional expression (8) is satisfied, the spherical aberration and the Petzval sum can be effectively controlled.

When the upper limit condition of the conditional expression (8) is not satisfied, the negative refractive index becomes much larger, and hence the Petzval sum becomes disadvantageously larger with respect to the image pickup lens. When the lower limit condition of the conditional expression (8) is not satisfied, the Petzval sum becomes disadvantageously smaller. Moreover, the refractive index of the positive lens becomes larger with respect to that of the negative lens, and the curvature of the positive lens becomes milder, with the result that the spherical aberration generated by the positive lens becomes disadvantageously smaller.

It is more preferred to set the conditional expression (8) as follows:

$$0.800 < Nn/Np < 1.250 \quad (8a).$$

The soft focus optical system according to one embodiment of the present invention may be used as a soft focus lens that is integrally connected to the image pickup optical system on the image side of the image pickup optical system, or as a soft focus optical apparatus having a configuration that is attachable/detachable on the image side of the image pickup optical system. Now, there are described configurations of the soft focus optical system and the image pickup optical system when the soft focus optical system is used as the soft focus lens having a configuration in which the soft focus optical system is integrated, or as a soft focus adapter having a configuration in which the soft focus optical system according to one embodiment of the present invention is attachable/detachable on the image side of the image pickup optical system.

When a spherical aberration amount at 100 percent of ray height with respect to the d-line in the in-focus state at the infinite distance at the time of being integrated with the image pickup optical system on the image side of the image pickup optical system is represented by SAs, the soft focus optical system according to one embodiment of the present invention satisfies the following conditional expression (9):

$$-7.000 \times 10^{-3} < (SAs - SA)/(2Y \times Fno) < -0.800 \times 10^{-3} \quad (9).$$

The conditional expression (9) defines the soft focus effect by the soft focus optical system. The conditional expression (9) is satisfied to generate undercorrected spherical aberration with respect to the image pickup optical system, with the result that soft depiction with beautiful quality of back bokeh can be expressed.

When the upper limit condition of the conditional expression (9) is not satisfied, it becomes difficult for the soft focus optical system to depict blur effectively.

It is more preferred to set the conditional expression (9) as follows:

$$-5.000 \times 10^{-3} < (SAs - SA)/(2Y \times Fno) < -0.800 \times 10^{-3} \quad (9a).$$

When the soft focus optical system according to one embodiment of the present invention is connected on the image side of the image pickup optical system, the above-mentioned conditional expression (1) means that a focal length of an entire system is substantially constant between a normal photographic lens consisting of only the image pickup optical system and the soft focus lens in which the soft focus optical system is connected. This is equivalent to satisfying a conditional expression (1c) when a focal length of the image pickup optical system is represented by f1, and a focal length of the soft focus lens obtained by connecting the soft focus optical system to the image pickup optical system is represented by "f".

$$0.950 < f/f1 < 1.050 \qquad (1c)$$

A lens apparatus in which the image pickup optical system and the soft focus adapter are detachably connected to each other, or the soft focus lens, consists of, in order from the object side to the image side, the image pickup optical system having a positive refractive power and the soft focus optical system, and the soft focus optical system consists of the following two lenses: a negative lens and a positive lens. The "refractive power" as used herein is defined as a reciprocal of a focal length.

When a distance from a surface closest to the image side of the image pickup optical system to a surface closest to the object side of the soft focus optical system is represented by L1, and a distance from the surface closest to the image side of the image pickup optical system to an image plane is represented by L1d, it is preferred to satisfy the following conditional expression (10):

$$0.000 < L1/L1d < 0.500 \qquad (10).$$

The conditional expression (10) defines a position of the soft focus optical system. When it is desired to change the spherical aberration, a larger change can be achieved as a ray height of the axial ray of the soft focus optical system becomes higher, and hence it is preferred in controlling the spherical aberration that the soft focus optical system be positioned closer to the image pickup optical system. Moreover, as the soft focus optical system becomes closer to the image pickup optical system, a ray height of the principal ray of the off-axial ray can be suppressed, with the result that the effect on peripheral performance can advantageously be suppressed more. When the conditional expression (10) is satisfied, arrangement that is effective in changing the spherical aberration can be achieved. When the ratio falls below the lower limit value of the conditional expression (10), it becomes difficult to control the spherical aberration. When the ratio exceeds the upper limit value of the conditional expression (10), the image pickup optical system and the soft focus optical system disadvantageously interfere with each other.

It is more preferred to set the conditional expression (10) as follows:

$$0.000 < L1/L1d < 0.300 \qquad (10a).$$

Further, when a distance on an optical axis from an exit pupil of a lens apparatus consisting of only the image pickup optical system to the image plane is represented by Tk1, it is preferred for the image pickup optical system, to which the soft focus optical system according to one embodiment of the present invention is applied, to satisfy the following conditional expression (11):

$$-0.033 < 1/Tk1 < -0.009 \qquad (11).$$

The conditional expression (11) defines the distance on the optical axis from the exit pupil of the lens apparatus consisting of only the image pickup optical system to the image plane. When the distance on the optical axis from the exit pupil of the image pickup optical system to the image plane does not satisfy the conditional expression (11), inclination angles of the axial ray and the principal ray of the off-axial ray that enter the surfaces of the soft focus lens become much larger, and hence it becomes difficult to achieve both the suppression of the various aberrations in the periphery and the generation of an appropriate amount of spherical aberration.

Now, Embodiments 1 to 14 of the present invention are described with reference to the accompanying drawings.

Embodiment 1

A soft focus optical system according to Embodiment 1 of the present invention is described with reference to FIG. 1 and FIG. 2.

FIG. 1 is a lens cross-sectional view of a soft focus lens according to Embodiment 1 of the present invention when in focus at an infinite distance object. The soft focus lens is described here as a soft focus lens having a configuration in which the soft focus optical system according to one embodiment of the present invention is integrated on the image side of the image pickup optical system. However, the present invention is not limited thereto, and similar effects can be obtained even with a configuration in which the soft focus optical system according to one embodiment of the present invention is attachable/detachable on the image side of the image pickup optical system. The same is true for Embodiments 2 to 14 below.

A first lens unit (image pickup optical system) U1 has a positive refractive power as a whole. The first lens unit U1 consists of a first sub-lens unit U11, a second sub-lens unit U12, and a third sub-lens unit U13. The third sub-lens unit U13 is configured to move from the image side to the object side during focus adjustment from the infinite distance to a finite distance. The second sub-lens unit U12 is a lens unit that is configured to move in conjunction with the third sub-lens unit U13 to correct an image plane variation accompanying focusing. An aperture stop SP is located between the second sub-lens unit U12 and the third sub-lens unit U13. A second lens unit U2 is a second lens unit (soft focus optical system) consisting of the following two lenses: a negative meniscus lens having a convex surface on the object side, and a positive meniscus lens having a convex surface on the object side. An image plane IP corresponds to an image pickup surface of an image pickup element (photoelectric conversion element).

An optical system of the first lens unit U1 alone acts as a normal photographic lens that is capable of sharp depiction, and when the second lens unit is added on the image side of the first lens unit, a soft focus lens that provides soft-focus depiction in which large spherical aberration is generated is obtained. Therefore, a normal lens consisting of only the first lens unit to which the second lens unit is not applied and the second lens unit are prepared, and the normal lens and the second lens unit are used in combination to easily obtain two kinds of lenses: the soft focus lens and the normal photographic lens.

The second lens unit U2 consists of the following two lenses: the negative meniscus lens having the convex surface on the object side and the positive meniscus lens having the convex surface on the object side, and has a negative refractive power as a whole. As a result, the spherical aberration can be changed significantly while the occurrences of the off-axial aberrations and other various aberrations are suppressed before and after the addition of the second lens unit, and negative spherical aberration can be generated by the second lens unit to express soft depiction for back bokeh, which is used frequently.

Next, lens configurations of the lens units in Embodiment 1 are described. In the following description, it is assumed that the lenses are arranged in order from the object side to the image side. The first lens unit U1 consists of a first sub-lens unit U11, a second sub-lens unit U12, and a third sub-lens unit U13. The first sub-lens unit U11 consists of two negative lenses and one positive lens, the second sub-lens unit U12 consists of a positive lens and a cemented lens of a positive lens and a negative lens, and the third sub-lens unit U13 consists of a cemented lens of a negative lens and a positive lens and two positive lenses. The configuration of the first lens unit is the same in each of Embodiments 1 to 7 and 10 to 14.

The second lens unit U2 in Embodiment 1 consists of a cemented lens consisting of, in order from the object side, a negative lens and a positive lens. The lenses are the negative meniscus lens having the convex surface on the object side and the positive meniscus lens having the convex surface on the object side. The soft focus lens according to Embodiment 1 has a focal length of 34.2 mm, a half angle of view of 32.3°, and an F-number of 1.45.

Figure 2:
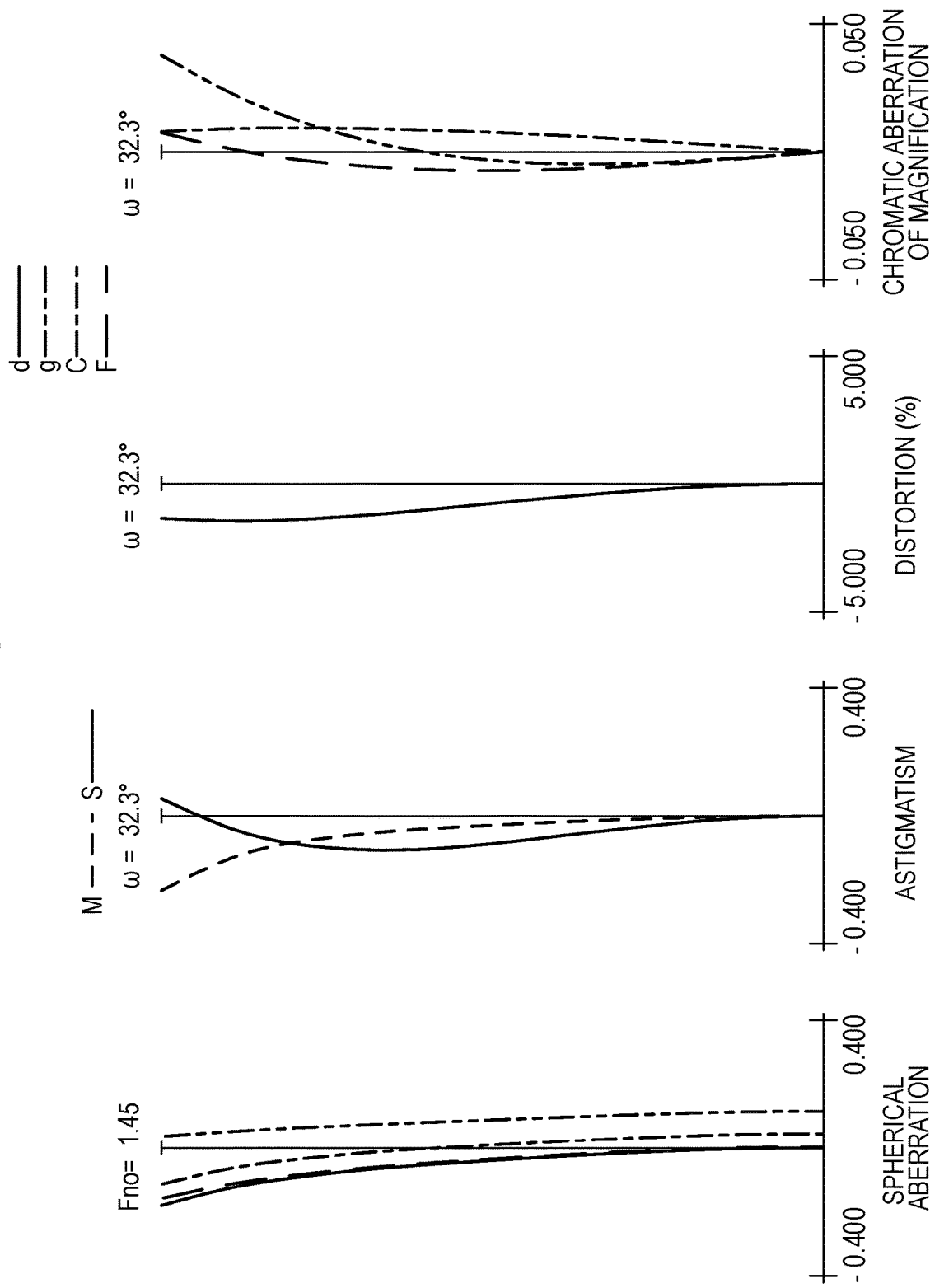
FIG. 2 is a longitudinal aberration diagram of the soft focus lens according to Embodiment 1 when in focus at the infinite distance.
Figure 29:
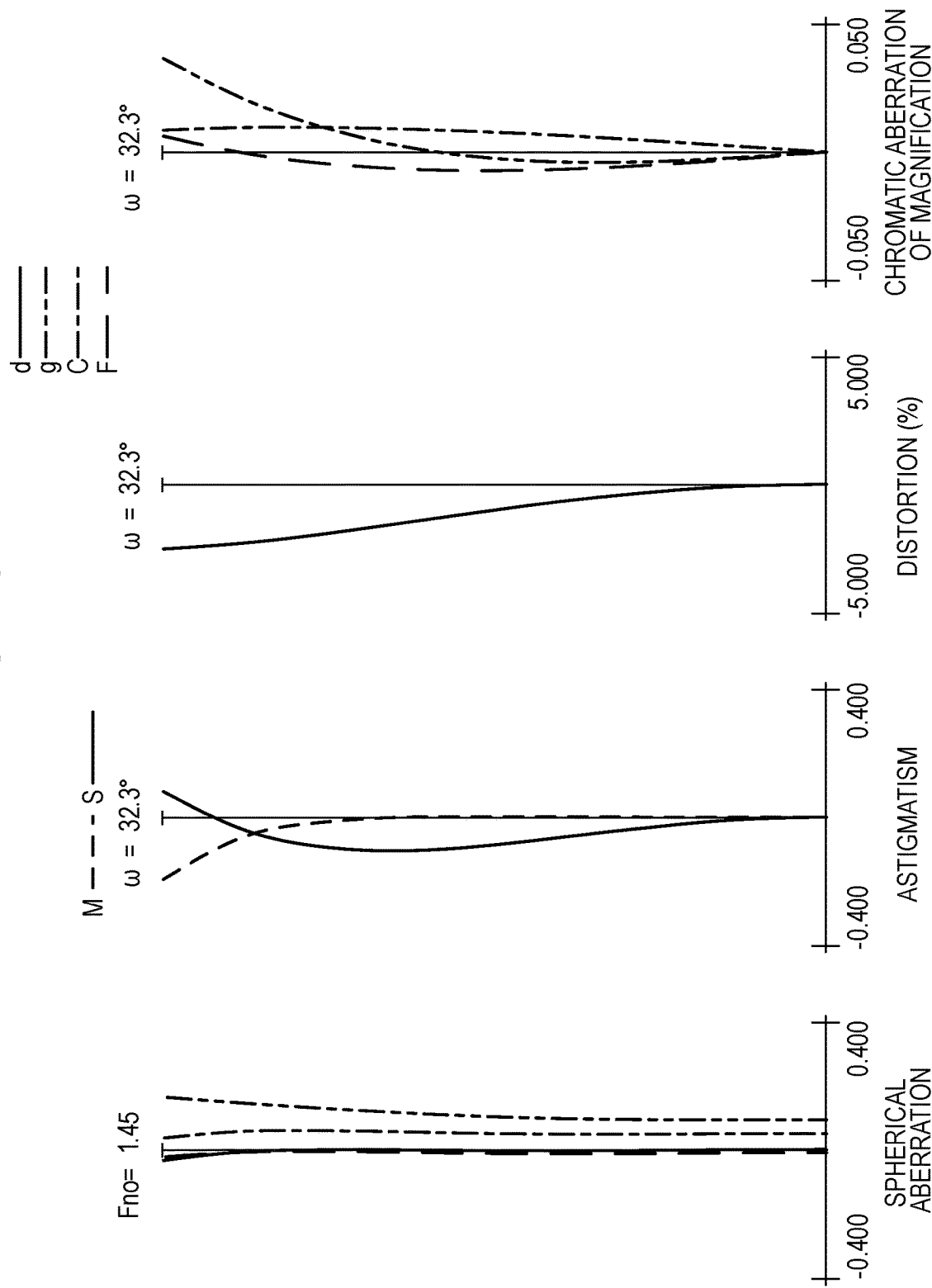
FIG. 29 is a longitudinal aberration diagram of a lens consisting of only an image pickup optical system in each of Embodiments 1 to 7 and 10 to 14 when in focus at the infinite distance.

FIG. 2 is a longitudinal aberration diagram of the soft focus lens according to Embodiment 1 when in focus at the infinite distance. FIG. 29 is a longitudinal aberration diagram of a lens apparatus consisting of only the first lens unit in Embodiment 1 when in focus at the infinite distance. The longitudinal aberration diagram of the lens apparatus consisting of only the first lens unit in Embodiment 1 when in focus at the infinite distance, which is illustrated in FIG. 29, is true for Embodiments 1 to 7 and 10 to 14. In the longitudinal aberration diagram, the solid line and the two-dot chain line in the spherical aberration diagram indicate an e-line and a g-line, respectively. The broken line and the solid line in the astigmatism diagram indicate a meridional image plane and a sagittal image plane, respectively, and the two-dot chain line in the chromatic aberration of magnification diagram indicates the g-line. A half angle of view is represented by "ω", and an F-number is represented by Fno. In the longitudinal aberration diagram, the spherical aberration is drawn on the scale of 0.4 mm, the astigmatism is drawn on the scale of 0.4 mm, distortion is drawn on the scale of 5%, and the chromatic aberration of magnification is drawn on the scale of 0.05 mm. As values corresponding to the conditional expressions in Embodiment 1 are shown in Table 1, Embodiment 1 satisfies the expressions (1), (3), (4), and (7) to (11).

Embodiment 2

Figure 3:
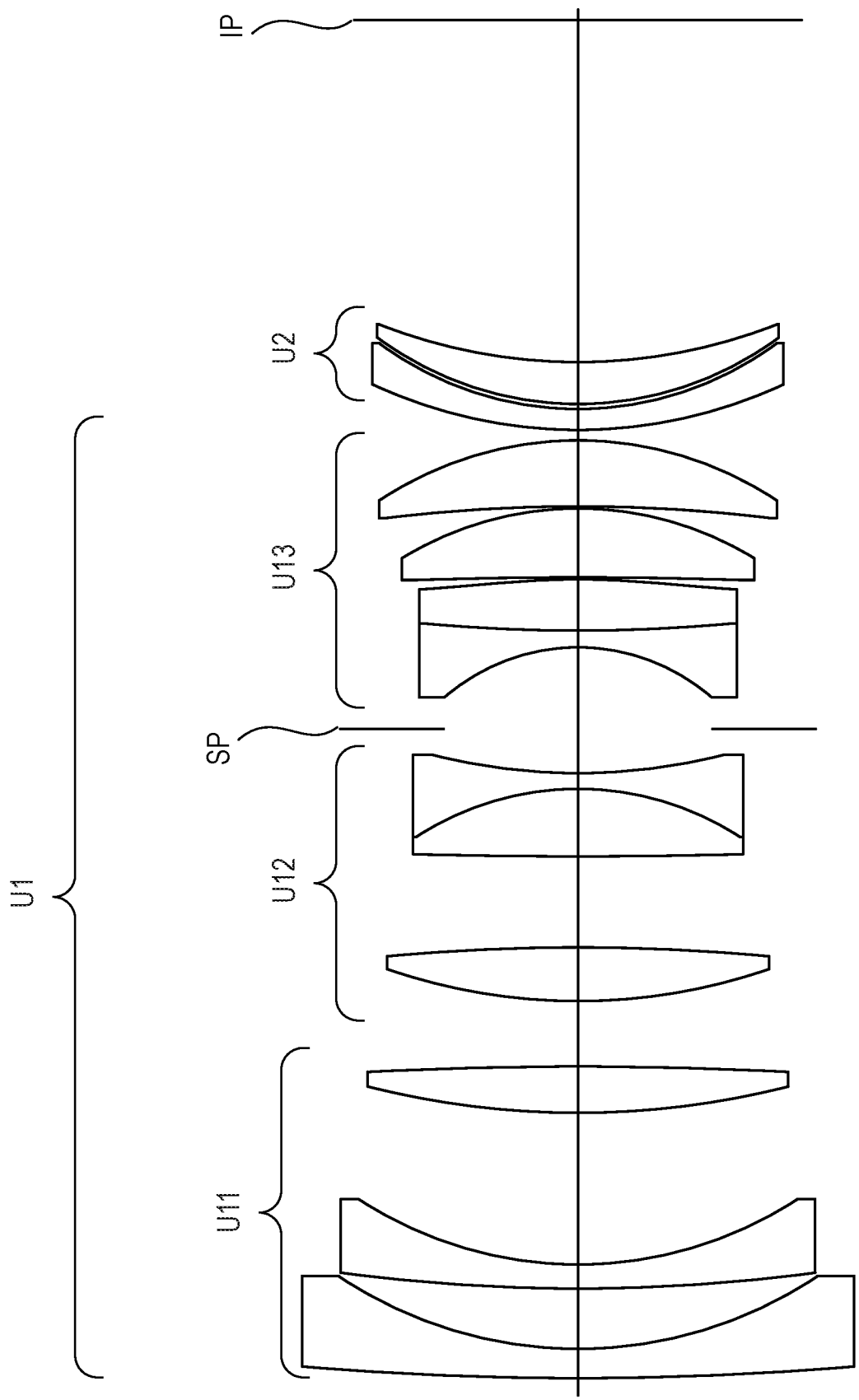
FIG. 3 is a cross-sectional view of a soft focus lens according to Embodiment 2 of the present invention when in focus at an infinite distance.

FIG. 3 is a lens cross-sectional view of a soft focus lens according to Embodiment 2 of the present invention when in focus at an infinite distance object.

In Embodiment 2, specific configurations of a first lens unit (first sub-lens unit U1f, a second sub-lens unit U12, and a third sub-lens unit U13) are the same as those in Embodiment 1.

A second lens unit (soft focus optical system) U2 in Embodiment 2 consists of, in order from the object side to the image side, the following single lenses: one negative lens and one positive lens. The lenses are a negative meniscus lens having a convex surface on the object side and a positive meniscus lens having a convex surface on the object side. The soft focus lens according to Embodiment 2, which consists of the first lens unit and the second lens unit, has a focal length of 34.2 mm, a half angle of view of 32.3°, and an F-number of 1.45.

Figure 4:
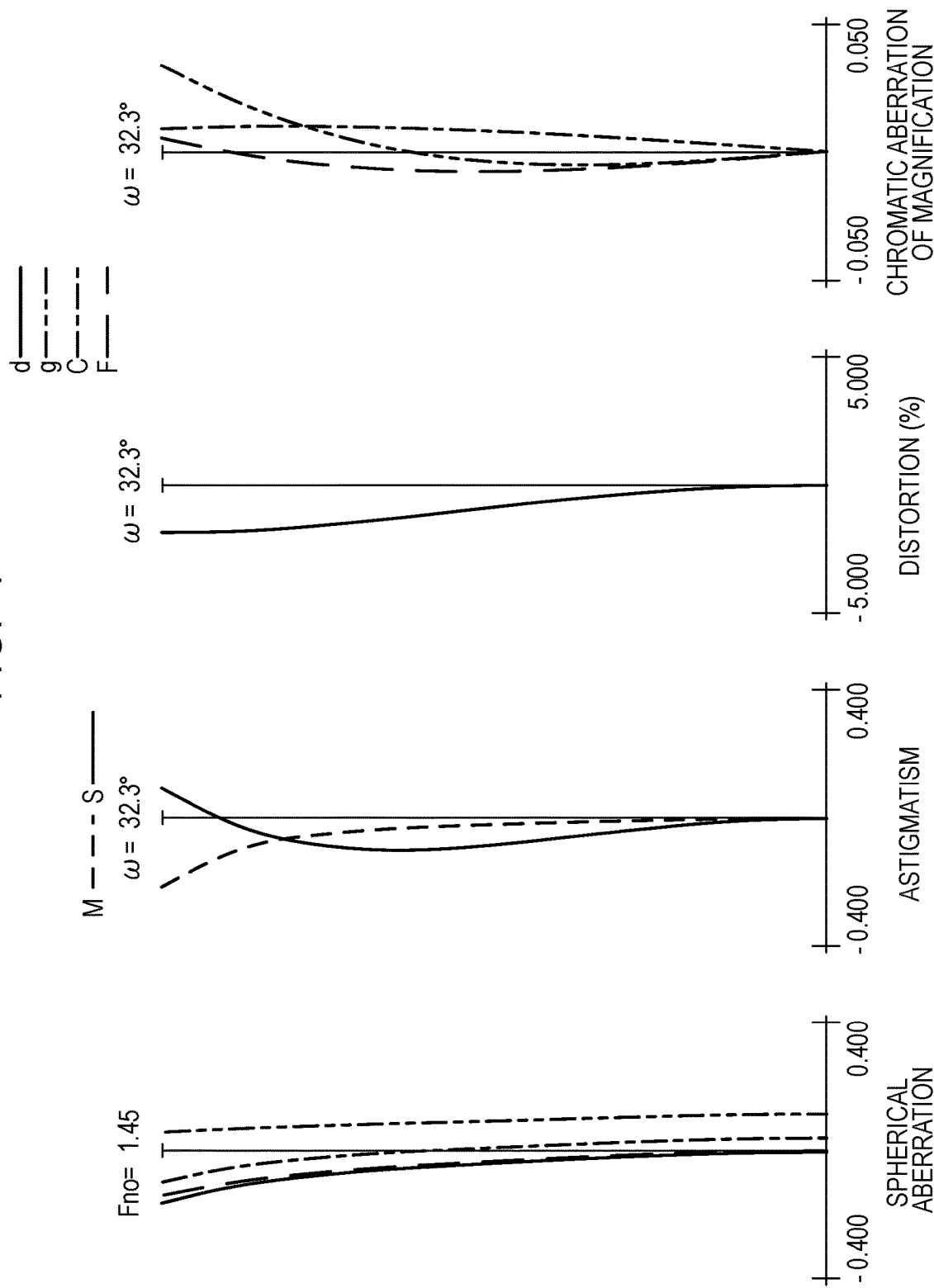
FIG. 4 is a longitudinal aberration diagram of the soft focus lens according to Embodiment 2 when in focus at the infinite distance.

FIG. 4 is a longitudinal aberration diagram of the soft focus lens according to Embodiment 2 when in focus at the infinite distance. FIG. 29 is a longitudinal aberration diagram of a lens apparatus consisting of only the first lens unit in Embodiment 2 when in focus at the infinite distance. The longitudinal aberration diagram of the lens apparatus consisting of only the first lens unit in Embodiment 2 when in focus at the infinite distance, which is illustrated in FIG. 29, is true for Embodiments 1 to 7 and 10 to 14.

As values corresponding to the conditional expressions in Embodiment 2 are shown in Table 1, Embodiment 2 satisfies the expressions (1), (3), (4), and (7) to (11).

Embodiment 3

Figure 5:
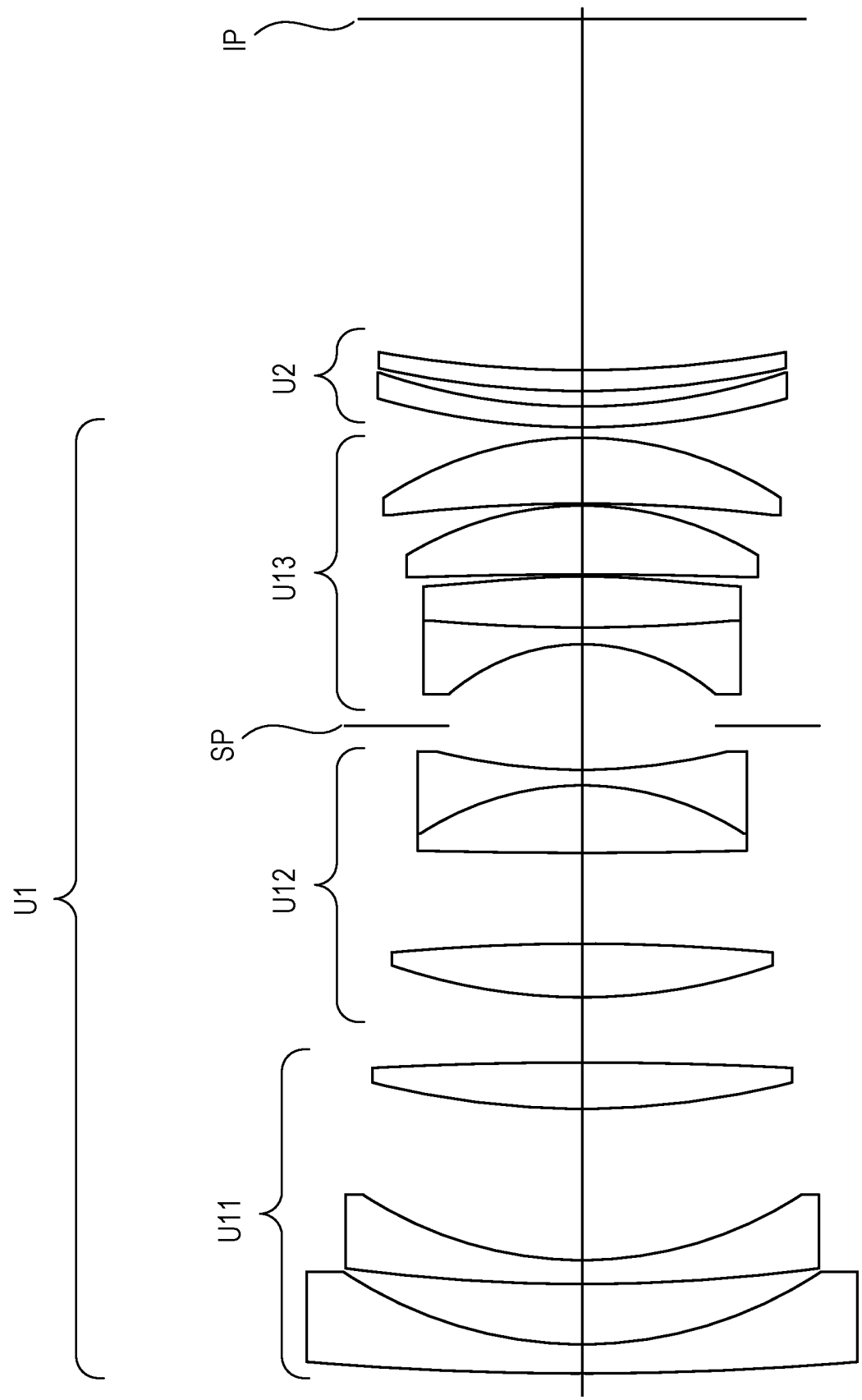
FIG. 5 is a cross-sectional view of a soft focus lens according to Embodiment 3 of the present invention when in focus at an infinite distance.

FIG. 5 is a lens cross-sectional view of a soft focus lens according to Embodiment 3 of the present invention when in focus at an infinite distance object.

In Embodiment 3, specific configurations of a first lens unit (first sub-lens unit U11, a second sub-lens unit U12, and a third sub-lens unit U13) are the same as those in Embodiment 1. A second lens unit (soft focus optical system) U2 in Embodiment 3 consists of, in order from the object side to the image side, the following single lenses: one negative lens and one positive lens. The lenses are a negative meniscus lens having a convex surface on the object side and a positive meniscus lens having a convex surface on the object side. The soft focus lens according to Embodiment 3, which consists of the first lens unit and the second lens unit, has a focal length of 34.2 mm, a half angle of view of 32.3°, and an F-number of 1.45.

Figure 6:
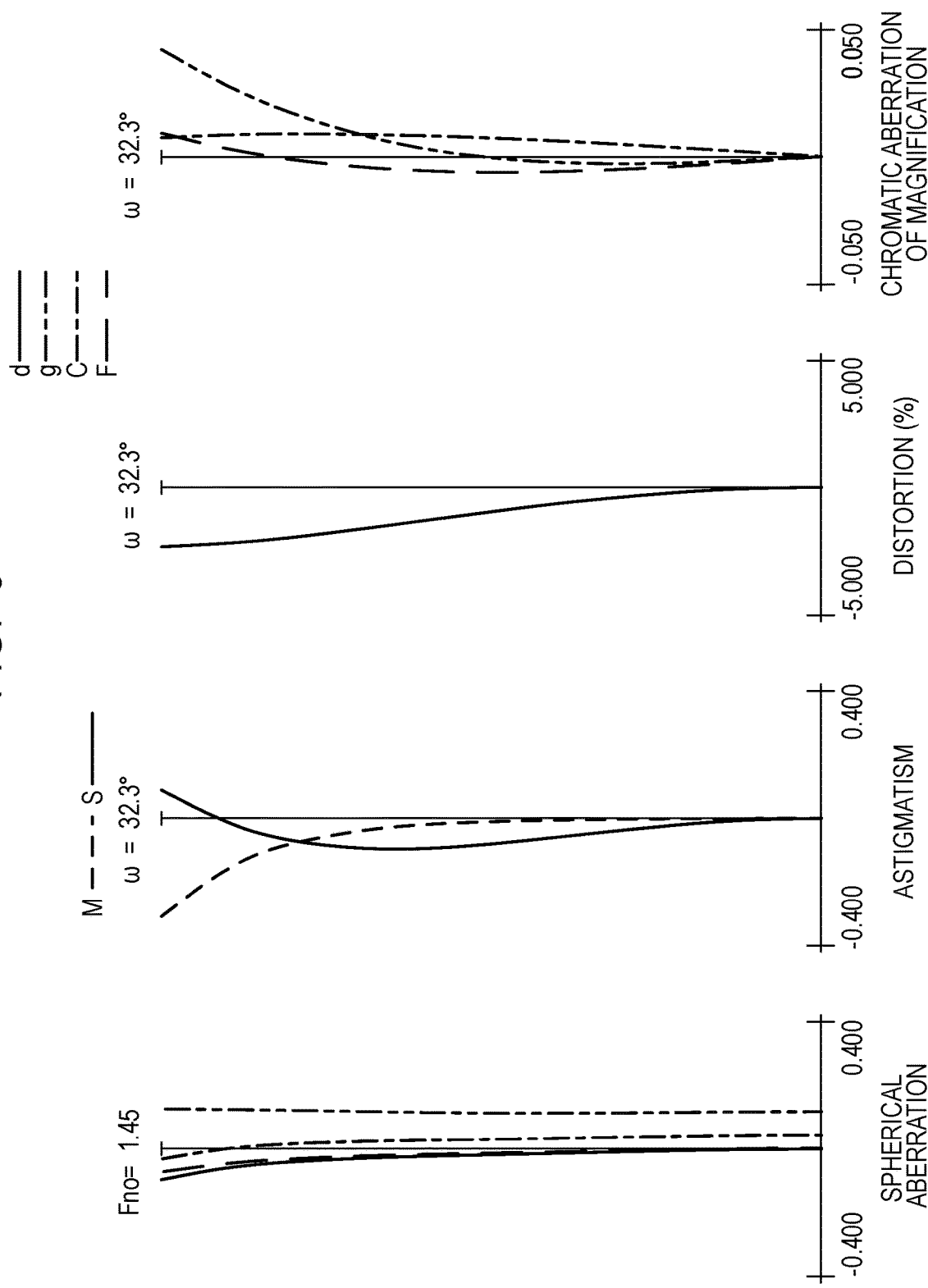
FIG. 6 is a longitudinal aberration diagram of the soft focus lens according to Embodiment 3 when in focus at the infinite distance.

FIG. 6 is a longitudinal aberration diagram of the soft focus lens according to Embodiment 3 when in focus at the infinite distance. FIG. 29 is a longitudinal aberration diagram of a lens apparatus consisting of only the first lens unit in Embodiment 3 when in focus at the infinite distance. The longitudinal aberration diagram of the lens apparatus consisting of only the first lens unit in Embodiment 3 when in focus at the infinite distance, which is illustrated in FIG. 29, is true for Embodiments 1 to 7 and 10 to 14.

As values corresponding to the conditional expressions in Embodiment 3 are shown in Table 1, Embodiment 3 satisfies the expressions (1), (2), (5), (6), and (8) to (11).

Embodiment 4

Figure 7:
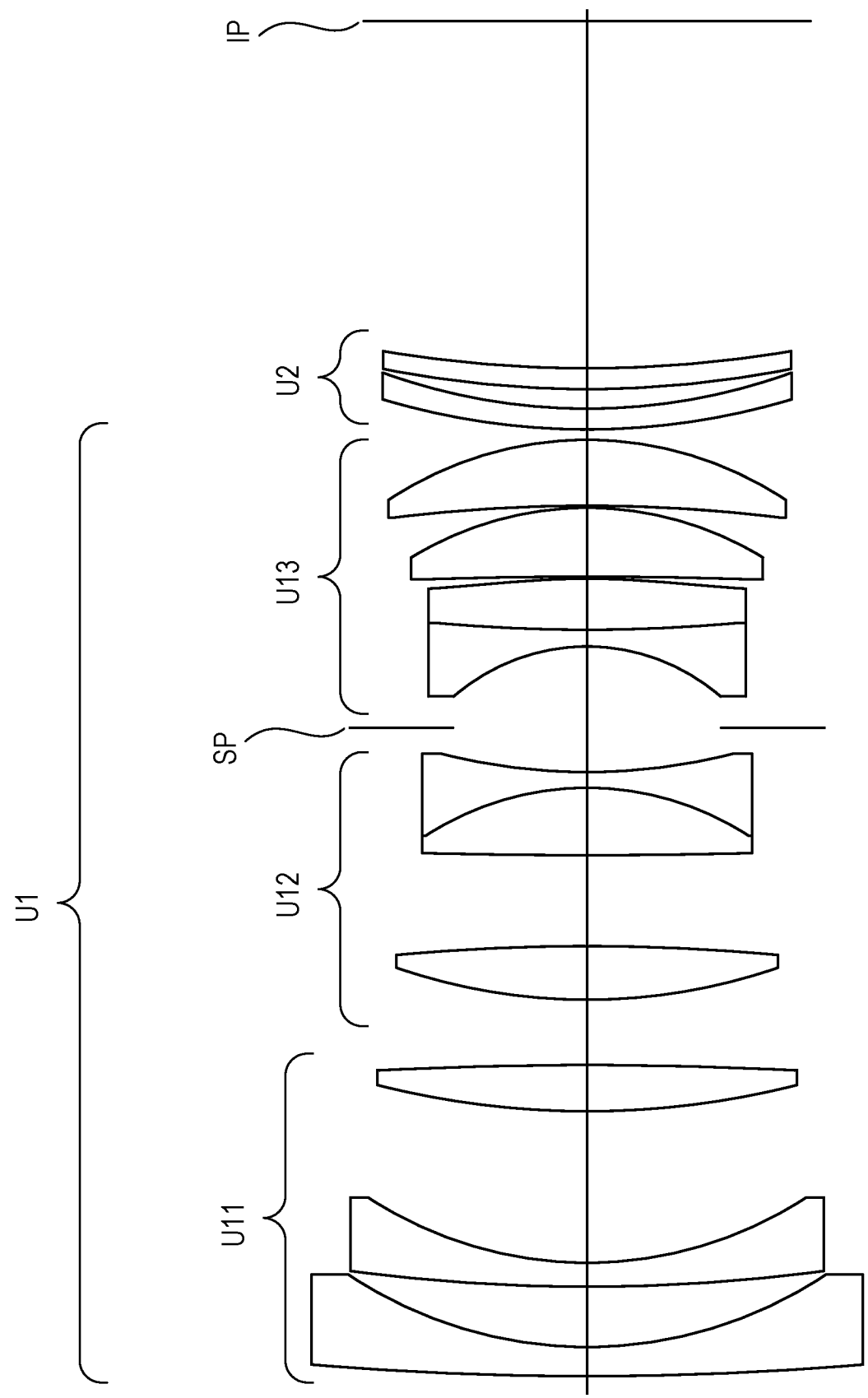
FIG. 7 is a cross-sectional view of a soft focus lens according to Embodiment 4 of the present invention when in focus at an infinite distance.

FIG. 7 is a lens cross-sectional view of a soft focus lens according to Embodiment 4 of the present invention when in focus at an infinite distance object.

In Embodiment 4, specific configurations of a first lens unit (first sub-lens unit U11, a second sub-lens unit U12, and a third sub-lens unit U13) are the same as those in Embodiment 1.

A second lens unit U2 in Embodiment 4 consists of a cemented lens of, in order from the object side to the image side, a negative lens and a positive lens. The lenses are a negative meniscus lens having a convex surface on the object side and a positive meniscus lens having a convex surface on the object side. The soft focus lens according to Embodiment 4, which consists of the first lens unit and the second lens unit, has a focal length of 34.2 mm, a half angle of view of 32.3°, and an F-number of 1.45.

Figure 8:
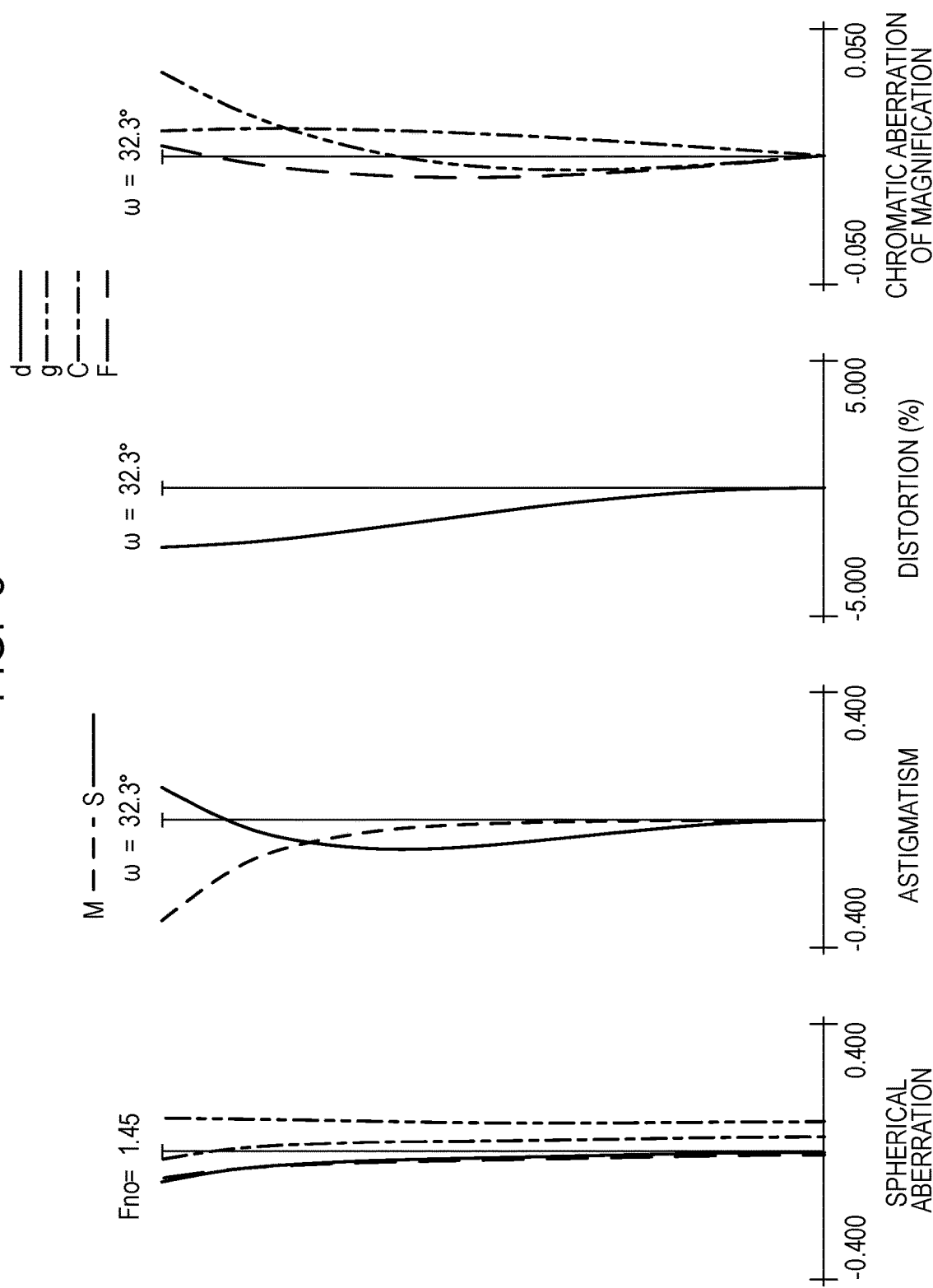
FIG. 8 is a longitudinal aberration diagram of the soft focus lens according to Embodiment 4 when in focus at the infinite distance.

FIG. 8 is a longitudinal aberration diagram of the soft focus lens according to Embodiment 4 when in focus at the infinite distance. FIG. 29 is a longitudinal aberration diagram of a lens apparatus consisting of only the first lens unit in Embodiment 4 when in focus at the infinite distance. The longitudinal aberration diagram of the lens apparatus consisting of only the first lens unit in Embodiment 4 when in focus at the infinite distance, which is illustrated in FIG. 29, is true for Embodiments 1 to 7 and 10 to 14.

As values corresponding to the conditional expressions in Embodiment 4 are shown in Table 1, Embodiment 4 satisfies the expressions (1), (2), (5), (6), and (8) to (11).

Embodiment 5

Figure 9:
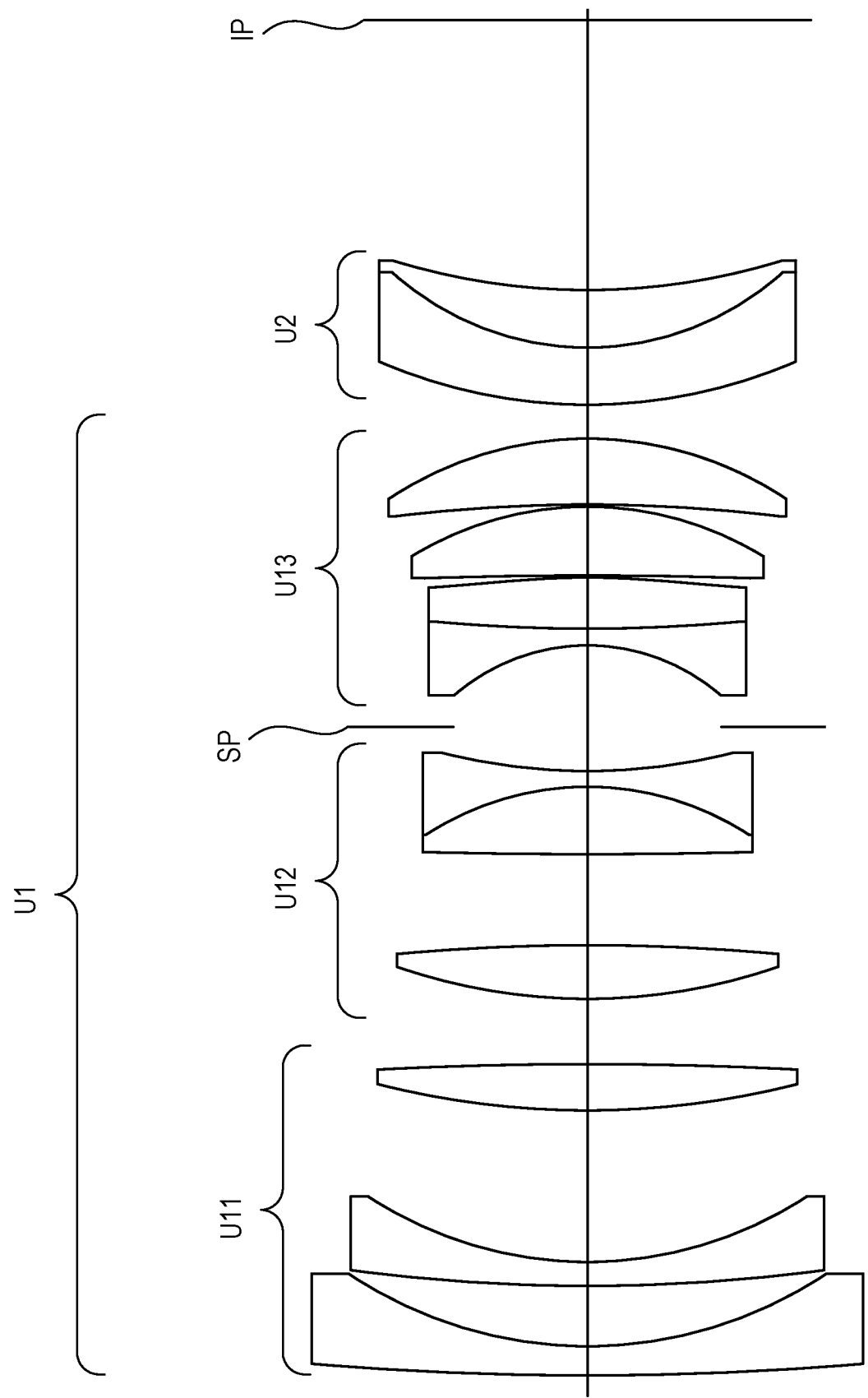
FIG. 9 is a cross-sectional view of a soft focus lens according to Embodiment 5 of the present invention when in focus at an infinite distance.

FIG. 9 is a lens cross-sectional view of a soft focus lens according to Embodiment 5 of the present invention when in focus at an infinite distance object.

In Embodiment 5, specific configurations of a first lens unit (first sub-lens unit U11, a second sub-lens unit U12, and a third sub-lens unit U13) are the same as those in Embodiment 1. A second lens unit U2 in Embodiment 5 consists of a cemented lens of, in order from the object side to the image side, a negative lens and a positive lens. The lenses are a negative meniscus lens having a convex surface on the object side and a positive meniscus lens having a convex surface on the object side. The soft focus lens according to Embodiment 5, which consists of the first lens unit and the second lens unit, has a focal length of 32.8 mm, a half angle of view of 33.4°, and an F-number of 1.39.

Figure 10:
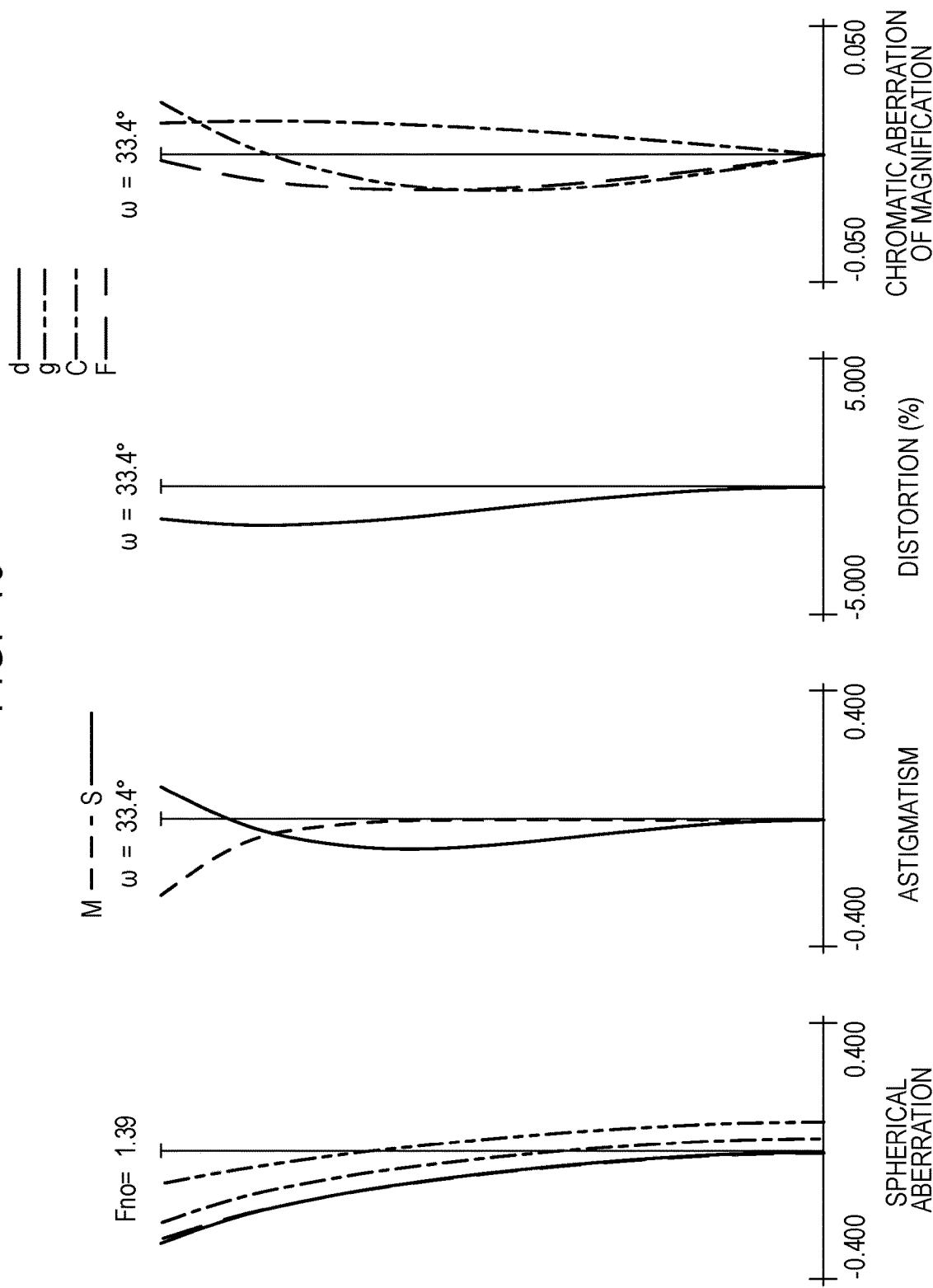
FIG. 10 is a longitudinal aberration diagram of the soft focus lens according to Embodiment 5 when in focus at the infinite distance.

FIG. 10 is a longitudinal aberration diagram of the soft focus lens according to Embodiment 5 when in focus at the infinite distance. FIG. 29 is a longitudinal aberration diagram of a lens apparatus consisting of only the first lens unit in Embodiment 5 when in focus at the infinite distance. The longitudinal aberration diagram of the lens apparatus consisting of only the first lens unit in Embodiment 5 when in focus at the infinite distance, which is illustrated in FIG. 29, is true for Embodiments 1 to 7 and 10 to 14.

As values corresponding to the conditional expressions in Embodiment 5 are shown in Table 1, Embodiment 5 satisfies the expressions (1), (3), (4), and (7) to (11).

Embodiment 6

Figure 11:
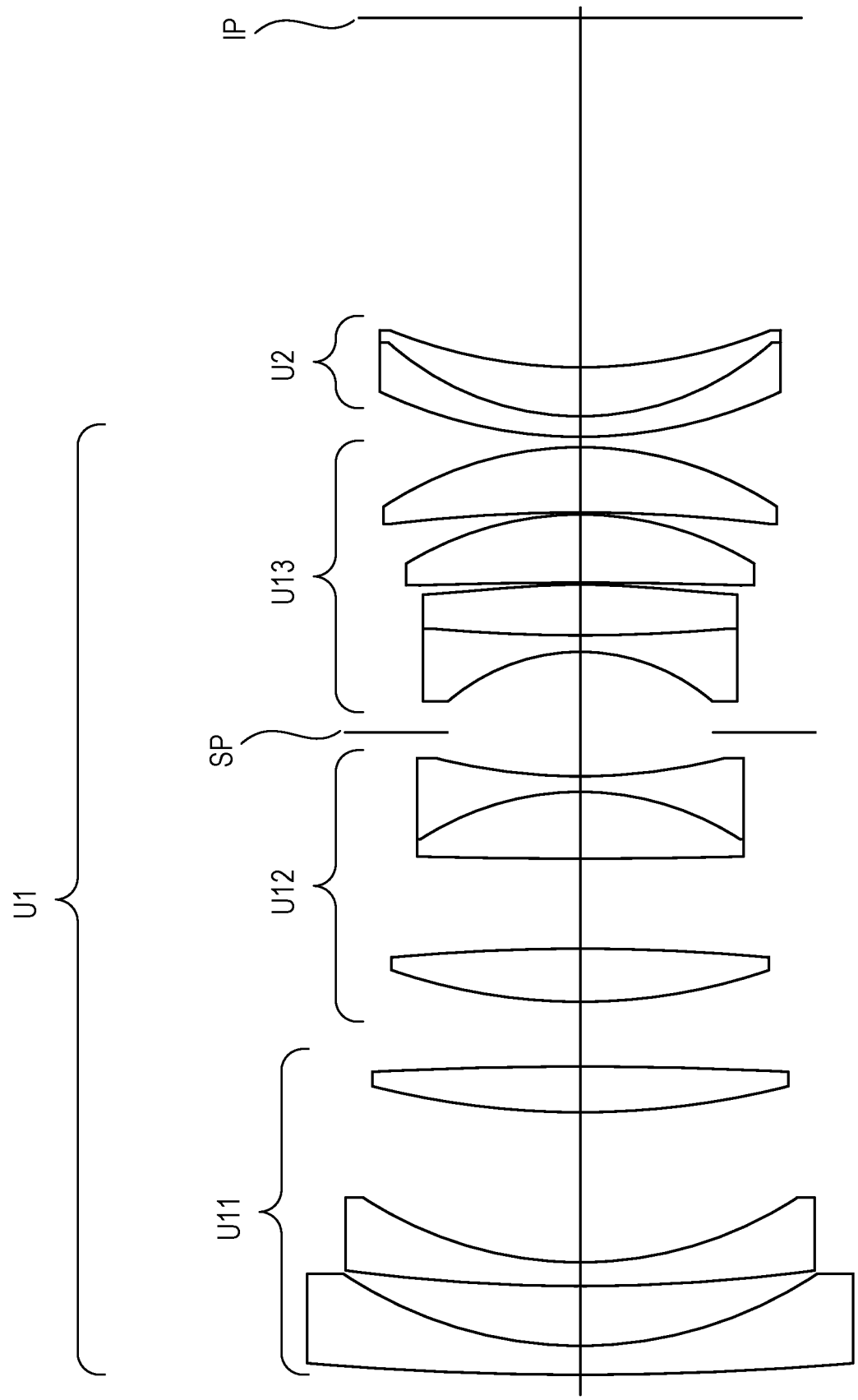
FIG. 11 is a cross-sectional view of a soft focus lens according to Embodiment 6 of the present invention when in focus at an infinite distance.

FIG. 11 is a lens cross-sectional view of a soft focus lens according to Embodiment 6 of the present invention when in focus at an infinite distance object.

In Embodiment 6, specific configurations of a first lens unit (first sub-lens unit U11, a second sub-lens unit U12, and a third sub-lens unit U13) are the same as those in Embodiment 1. A second lens unit U2 in Embodiment 6 consists of a cemented lens of, in order from the object side, a negative lens and a positive lens. The lenses are a negative meniscus lens having a convex surface on the object side and a positive meniscus lens having a convex surface on the object side. The soft focus lens according to Embodiment 6, which consists of the first lens unit and the second lens unit, has a focal length of 35.6 mm, a half angle of view of 31.3°, and an F-number of 1.51.

Figure 12:
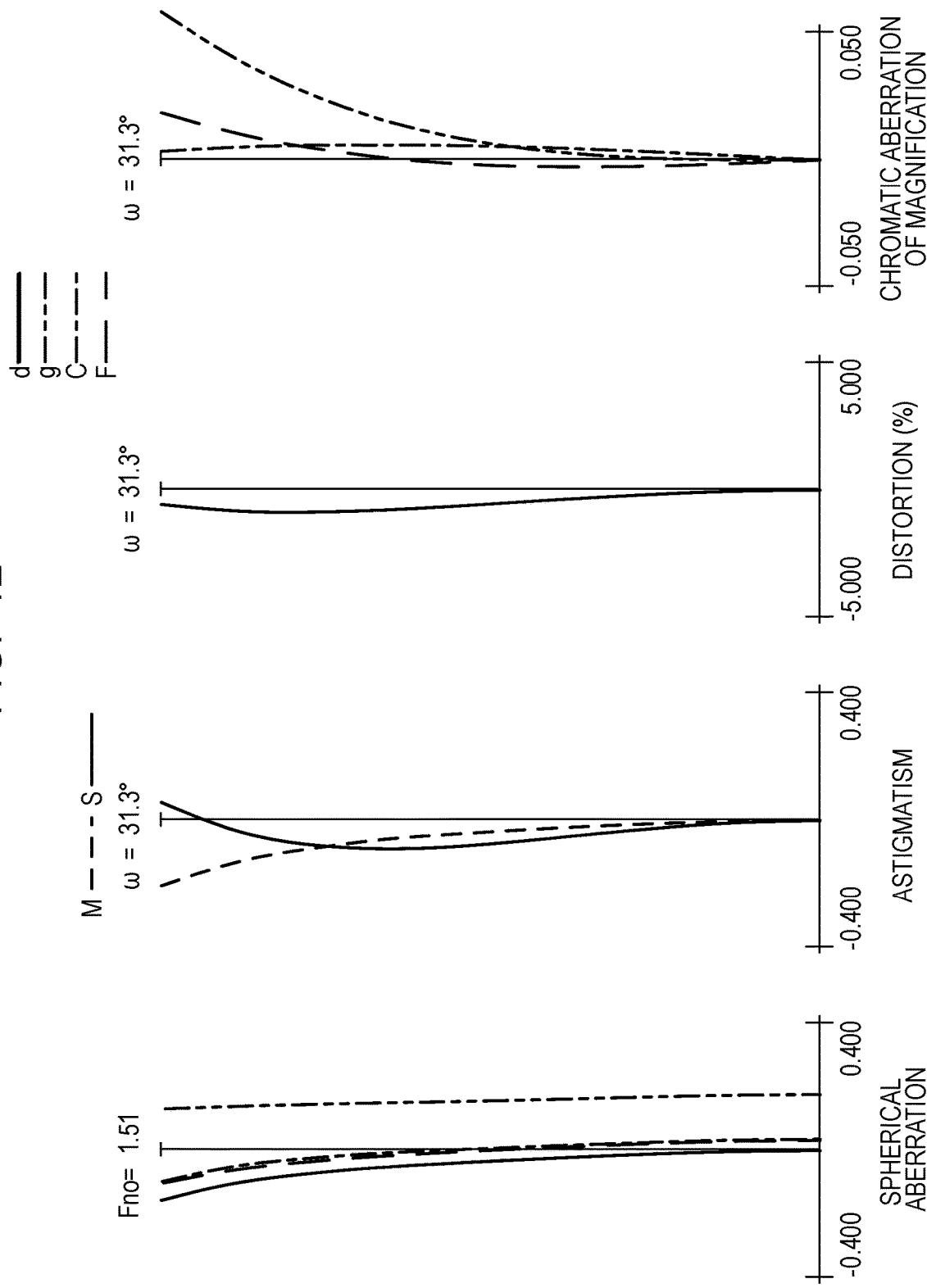
FIG. 12 is a longitudinal aberration diagram of the soft focus lens according to Embodiment 6 when in focus at the infinite distance.

FIG. 12 is a longitudinal aberration diagram of the soft focus lens according to Embodiment 6 when in focus at the infinite distance. FIG. 29 is a longitudinal aberration diagram of a lens apparatus consisting of only the first lens unit in Embodiment 6 when in focus at the infinite distance. The longitudinal aberration diagram of the lens apparatus consisting of only the first lens unit in Embodiment 6 when in focus at the infinite distance, which is illustrated in FIG. 29, is true for Embodiments 1 to 7 and 10 to 14.

As values corresponding to the conditional expressions in Embodiment 6 are shown in Table 1, Embodiment 6 satisfies the expressions (1), (3), (4), and (7) to (11).

Embodiment 7

Figure 13:
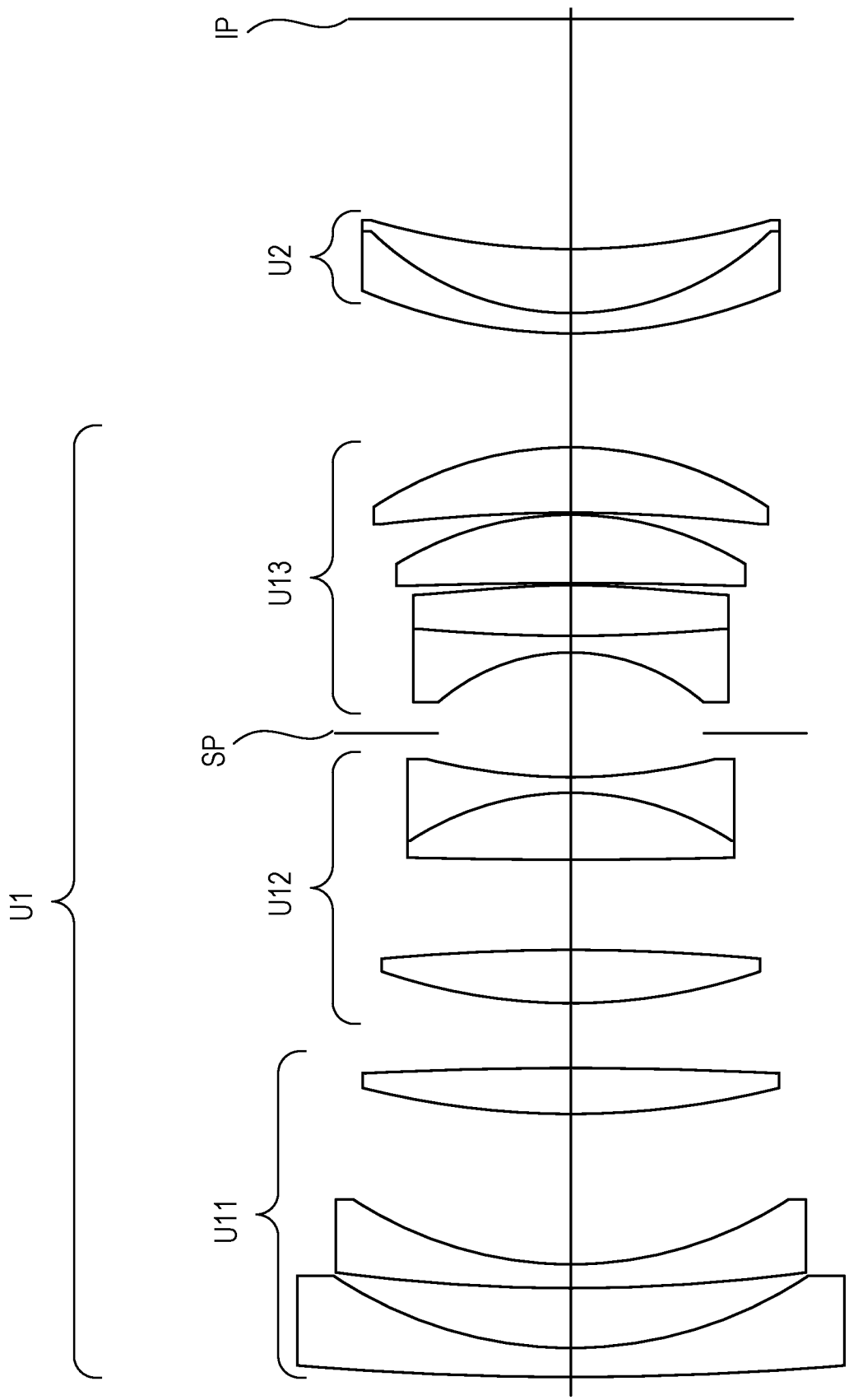
FIG. 13 is a cross-sectional view of a soft focus lens according to Embodiment 7 of the present invention when in focus at an infinite distance.

FIG. 13 is a lens cross-sectional view of a soft focus lens according to Embodiment 7 of the present invention when in focus at an infinite distance object.

In Embodiment 7, specific configurations of a first lens unit (first sub-lens unit U11, a second sub-lens unit U12, and a third sub-lens unit U13) are the same as those in Embodiment 1. A second lens unit U2 in Embodiment 7 consists of a cemented lens of, in order from the object side, a negative lens and a positive lens. The lenses are a negative meniscus lens having a convex surface on the object side and a positive meniscus lens having a convex surface on the object side. The soft focus lens according to Embodiment 7, which consists of the first lens unit and the second lens unit, has a focal length of 34.2 mm, a half angle of view of 32.3°, and an F-number of 1.45.

Figure 14:
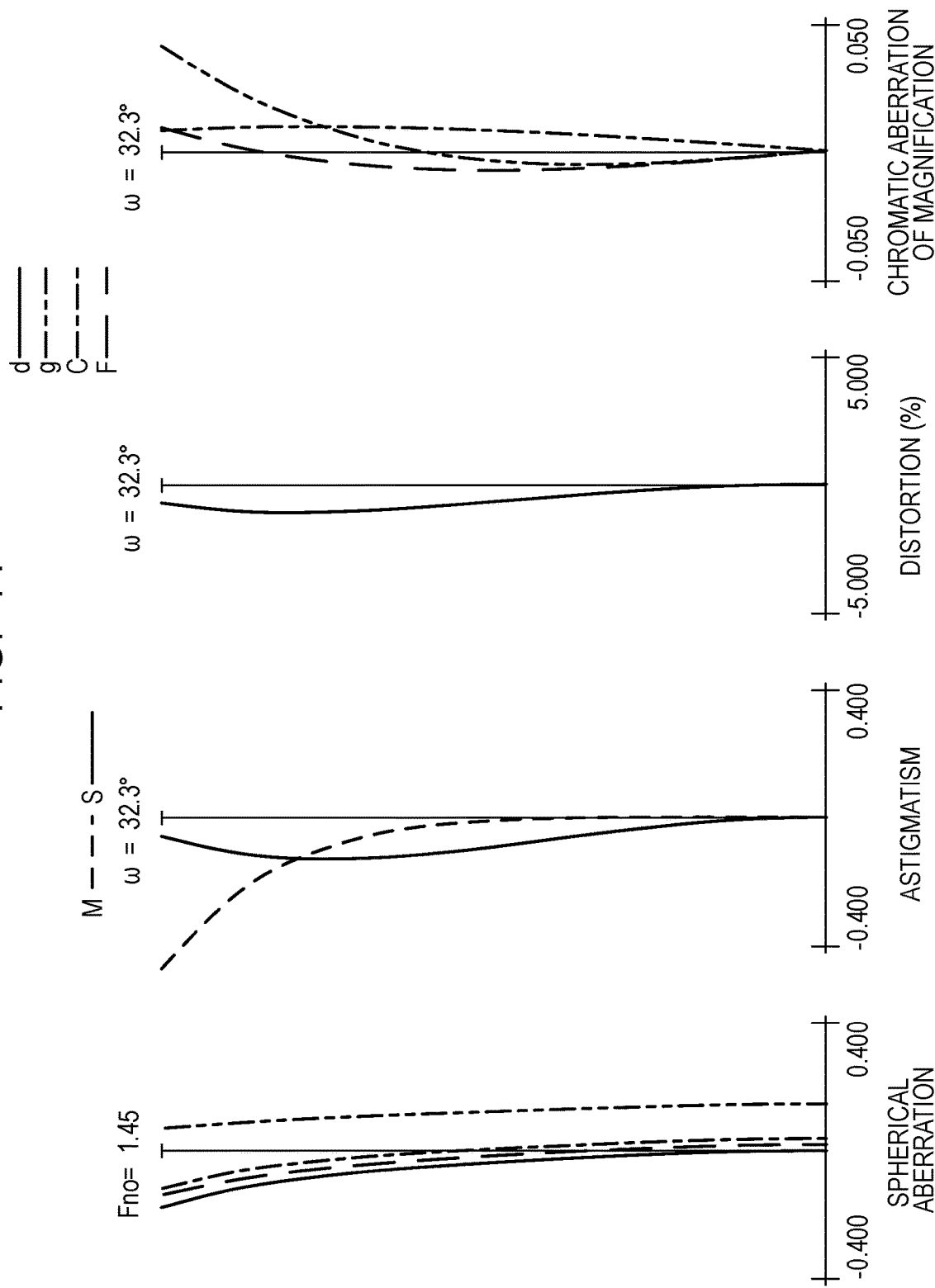
FIG. 14 is a longitudinal aberration diagram of the soft focus lens according to Embodiment 7 when in focus at the infinite distance.

FIG. 14 is a longitudinal aberration diagram of the soft focus lens according to Embodiment 7 when in focus at the infinite distance. FIG. 29 is a longitudinal aberration diagram of a lens apparatus consisting of only the first lens unit in Embodiment 7 when in focus at the infinite distance. The longitudinal aberration diagram of the lens apparatus consisting of only the first lens unit in Embodiment 7 when in focus at the infinite distance, which is illustrated in FIG. 29, is true for Embodiments 1 to 7 and 10 to 14.

As values corresponding to the conditional expressions in Embodiment 7 are shown in Table 1, Embodiment 7 satisfies the expressions (1), (3), (4), and (7) to (11).

Embodiment 8

Figure 15:
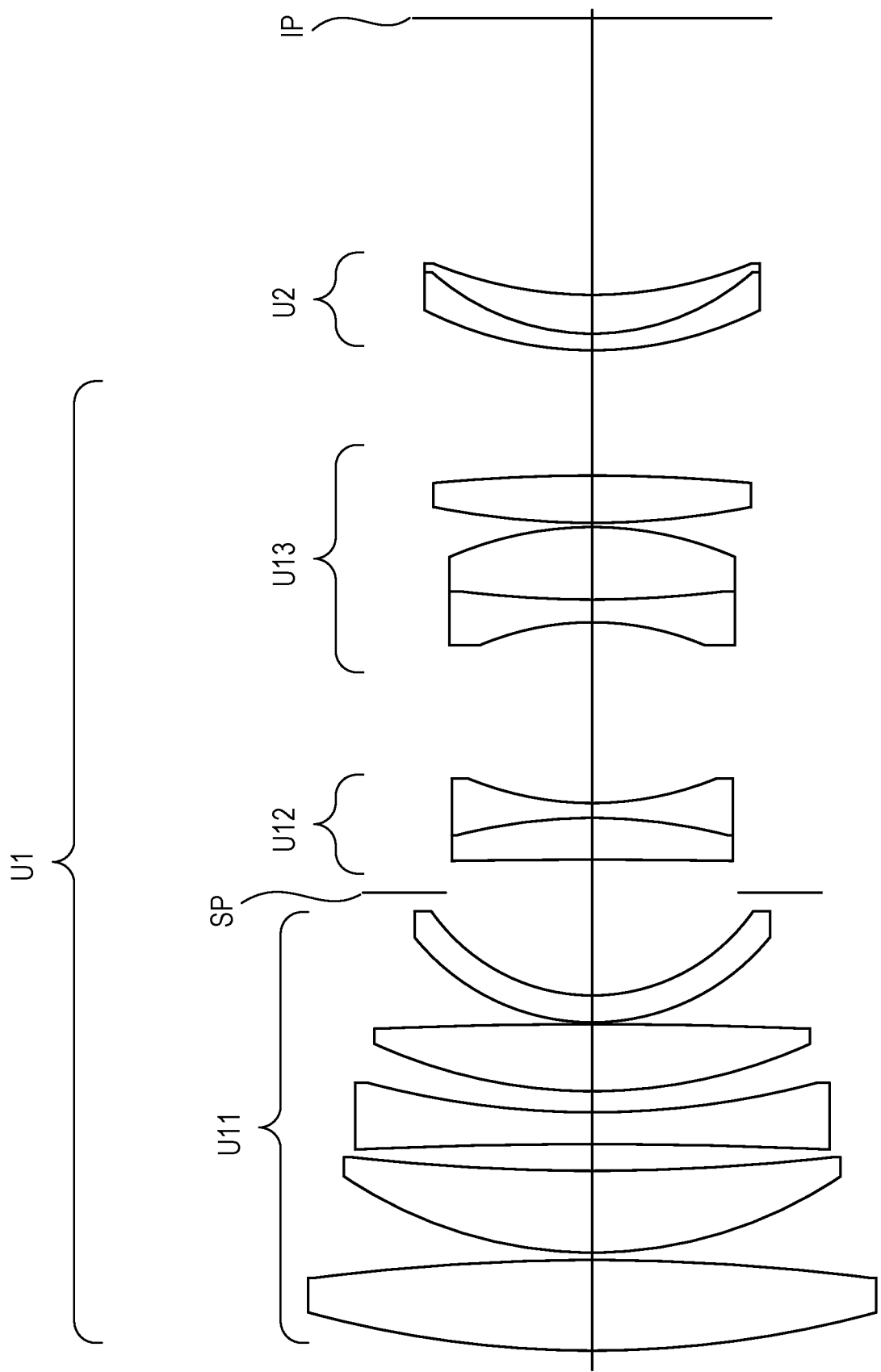
FIG. 15 is a cross-sectional view of a soft focus lens according to Embodiment 8 of the present invention when in focus at an infinite distance.

FIG. 15 is a lens cross-sectional view of a soft focus lens according to Embodiment 8 of the present invention when in focus at an infinite distance object.

A configuration of the soft focus lens according to Embodiment 8 is described. In the following description, it is assumed that lenses are arranged in order from the object side to the image side. A first lens unit U1 consists of a first sub-lens unit U11, a second sub-lens unit U12, and a third sub-lens unit U13. The first lens unit U1 has a positive refractive power as a whole. The first sub-lens unit U11 consists of two positive lenses, one negative lens, one positive lens, and one negative lens. The second sub-lens unit U12 consists of a cemented lens of a positive lens and a negative lens. The third sub-lens unit U13 consists of a cemented lens of a negative lens and a positive lens and one positive lens. The second sub-lens unit U12 is configured to move from the object side to the image side during focus adjustment from the infinite distance to the finite distance. The first sub-lens unit U11 and the third sub-lens unit U13 are lens units that are not configured to move for focusing. An aperture stop SP is located between the first sub-lens unit U11 and the second sub-lens unit U12. A configuration of a second lens unit (soft focus optical system) U2 is the same as that in Embodiment 1, and the second lens unit U2 consists of a cemented lens of, in order from the object side to the image side, a negative lens and a positive lens. The lenses are a negative meniscus lens having a convex surface on the object side and a positive meniscus lens having a convex surface on the object side. An image plane IP corresponds to an image pickup surface of an image pickup element (photoelectric conversion element). The soft focus lens having the configuration in Embodiment 8, which consists of the first lens unit and the second lens unit, has a focal length of 131.0 mm, a half angle of view of 9.37°, and an F-number of 2.06.

Figure 16:
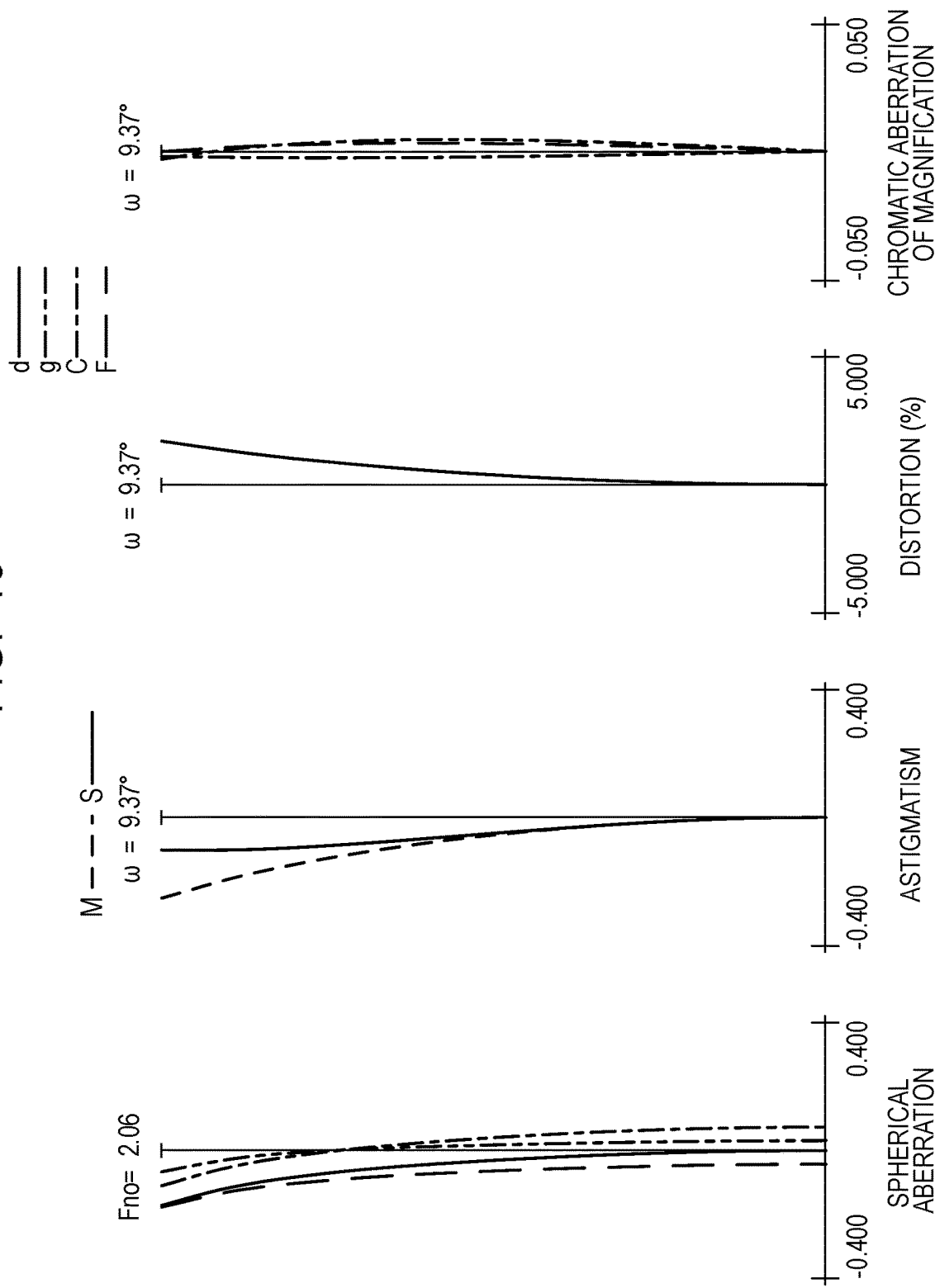
FIG. 16 is a longitudinal aberration diagram of the soft focus lens according to Embodiment 8 when in focus at the infinite distance.
Figure 30:
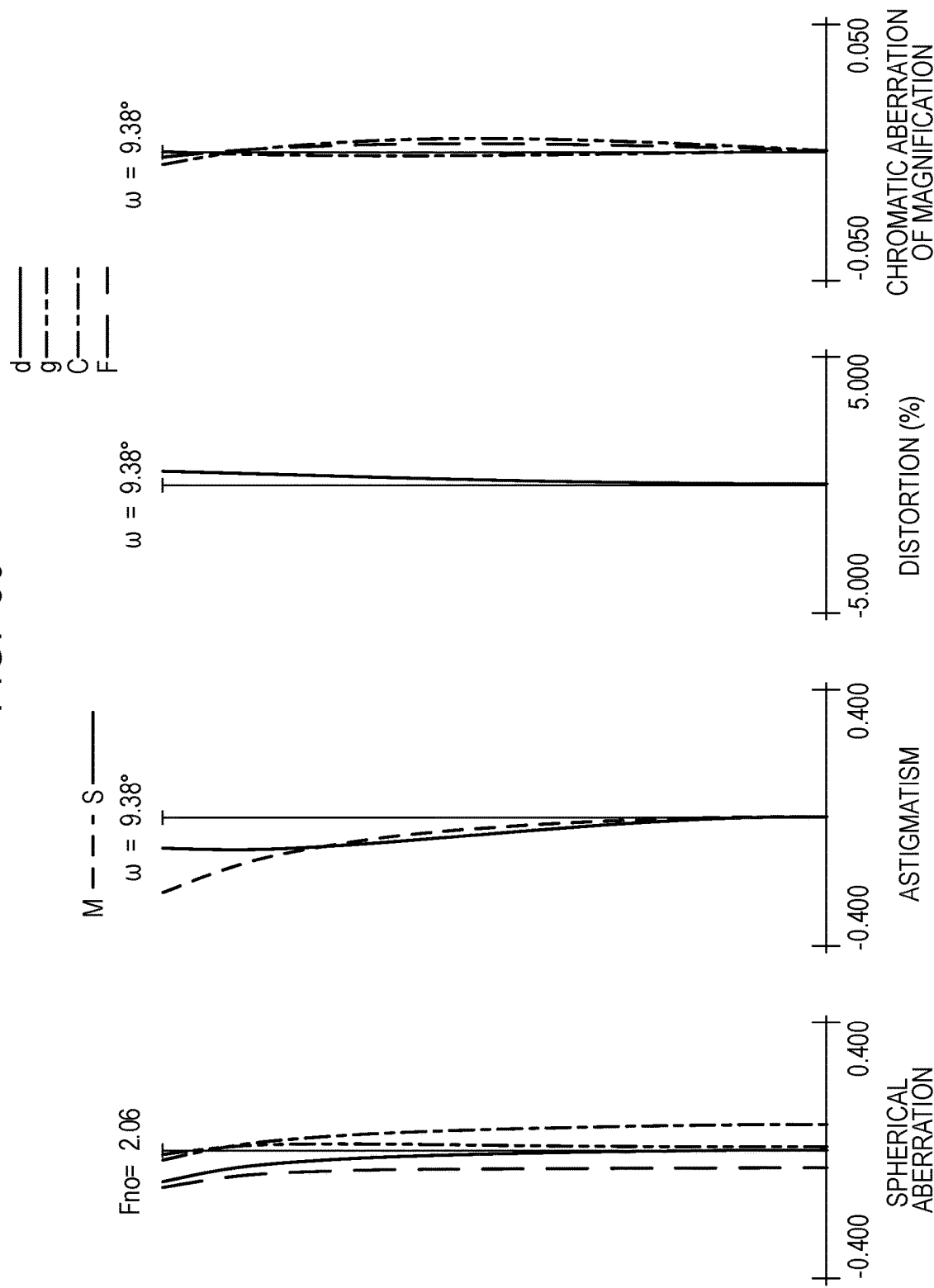
FIG. 30 is a longitudinal aberration diagram of a lens consisting of only an image pickup optical system in Embodiment 8 when in focus at the infinite distance.

FIG. 16 is a longitudinal aberration diagram of the soft focus lens according to Embodiment 8 when in focus at the infinite distance. FIG. 30 is a longitudinal aberration diagram of a lens apparatus consisting of only the first lens unit in Embodiment 8 when in focus at the infinite distance.

As values corresponding to the conditional expressions in Embodiment 8 are shown in Table 1, Embodiment 8 satisfies the expressions (1), (3), (4), and (7) to (11).

Embodiment 9

Figure 17:
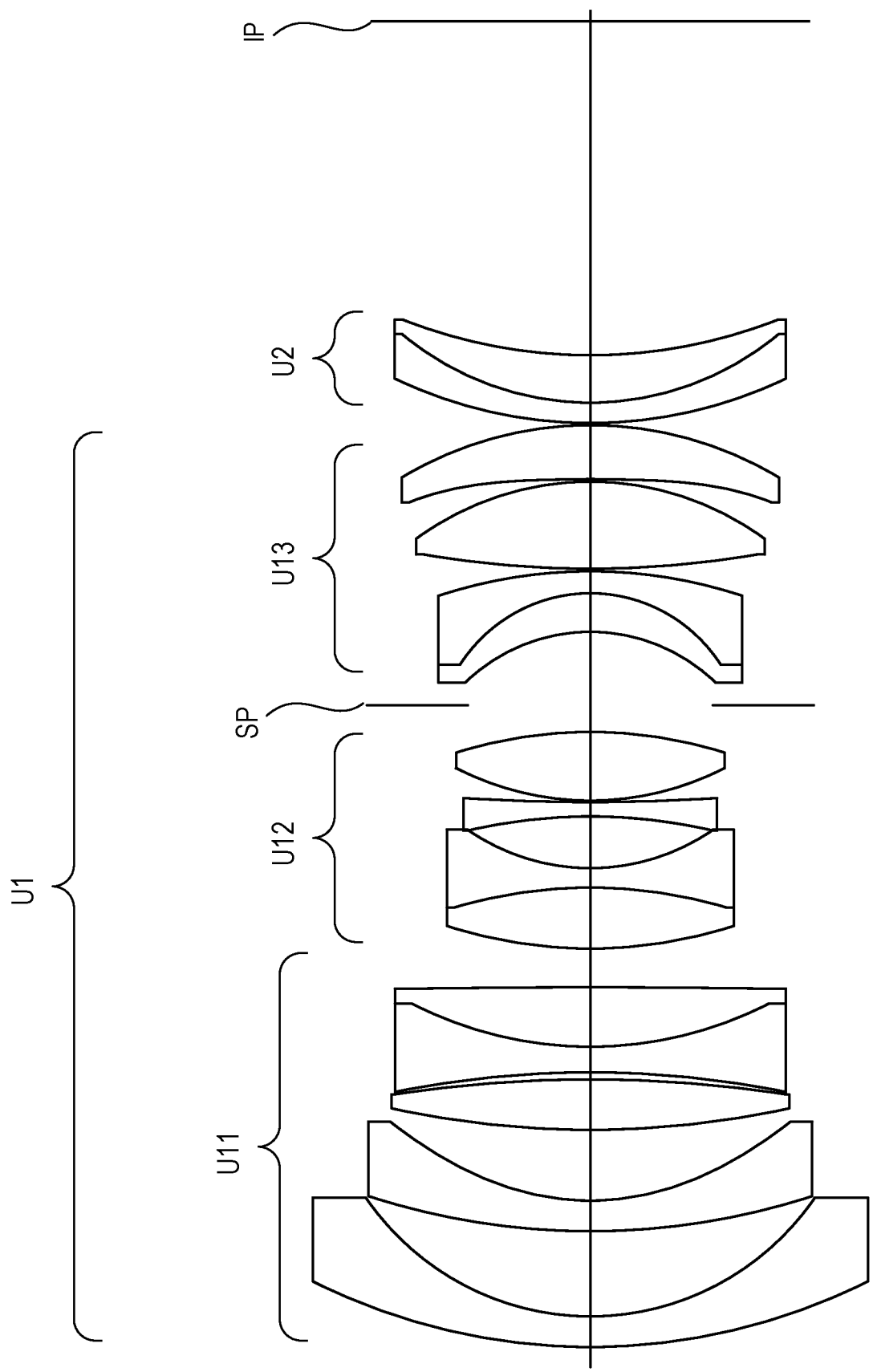
FIG. 17 is a cross-sectional view of a soft focus lens according to Embodiment 9 of the present invention when in focus at an infinite distance.

FIG. 17 is a lens cross-sectional view of a soft focus lens according to Embodiment 9 of the present invention when in focus at an infinite distance object.

A configuration of the soft focus lens according to Embodiment 9 is described. In the following description, it is assumed that lenses are arranged in order from the object side to the image side. A first lens unit U1 consists of a first sub-lens unit U11, a second sub-lens unit U12, and a third sub-lens unit U13. The first lens unit U1 has a positive refractive power as a whole. The first sub-lens unit U11 consists of two negative lenses, one positive lens, and a cemented lens of a negative lens and a positive lens, the second sub-lens unit U12 consists of a cemented lens of a positive lens and a negative lens, one negative lens, and one positive lens, and the third sub-lens unit U13 consists of a cemented lens of a positive lens and a negative lens and two positive lenses. The third sub-lens unit U13 is configured to move from the image side to the object side during focus adjustment from the infinite distance to the finite distance. The second sub-lens unit U12 is configured to move in conjunction with the third sub-lens unit U13 to correct an image plane variation accompanying focusing. An aperture stop SP is located between the second sub-lens unit U12 and the third sub-lens unit U13.

A configuration of a second lens unit (soft focus optical system) U2 is the same as that in Embodiment 1, and the second lens unit U2 consists of a cemented lens of, in order from the object side to the image side, a negative lens and a positive lens. An image plane IP corresponds to an image pickup surface of an image pickup element (photoelectric conversion element). The lenses are a negative meniscus lens having a convex surface on the object side and a positive meniscus lens having a convex surface on the object side. The soft focus lens according to Embodiment 9, which consists of the first lens unit and the second lens unit, has a focal length of 24.6 mm, a half angle of view of 41.4°, and an F-number of 1.45.

Figure 18:
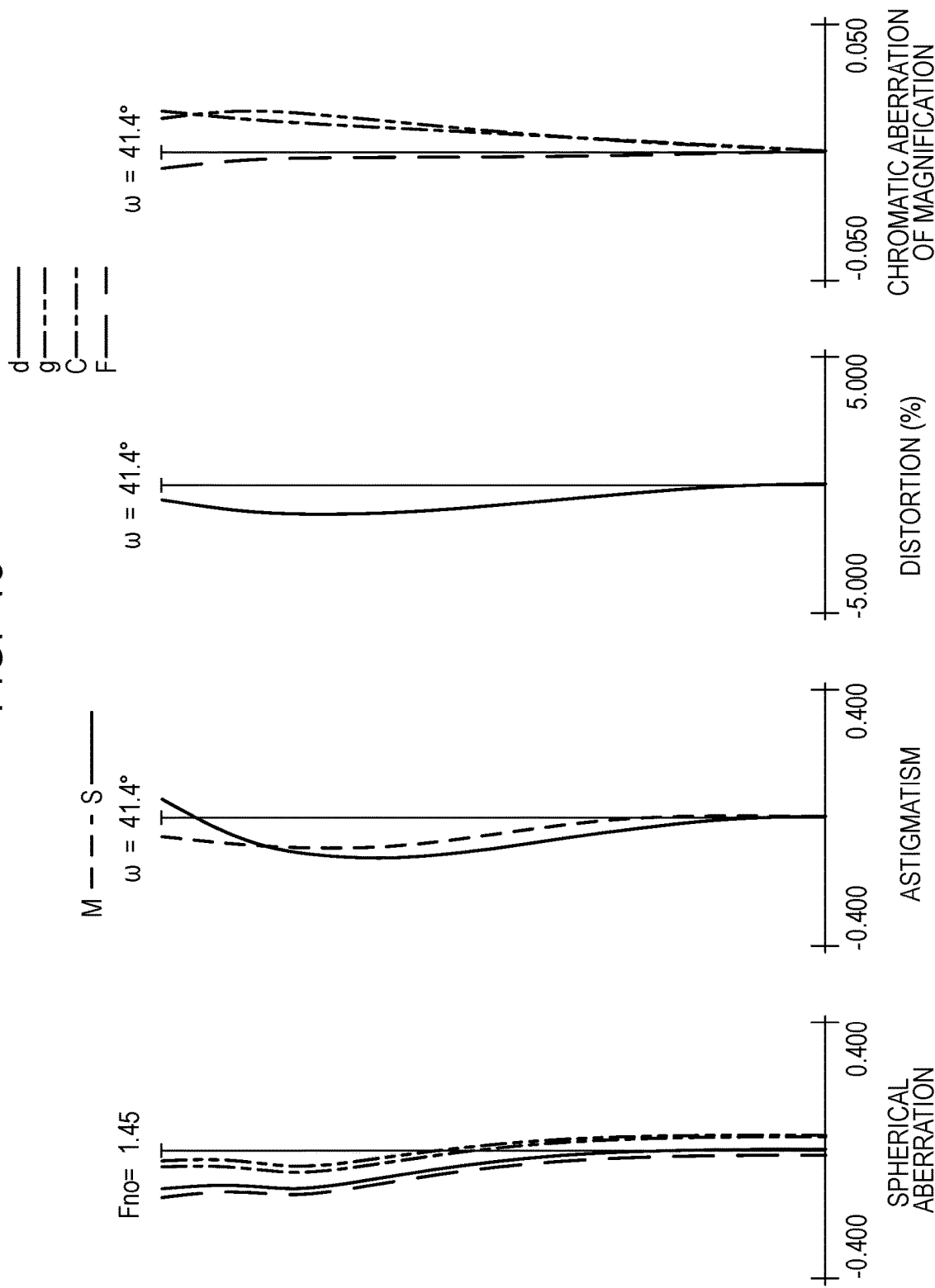
FIG. 18 is a longitudinal aberration diagram of the soft focus lens according to Embodiment 9 when in focus at the infinite distance.
Figure 31:
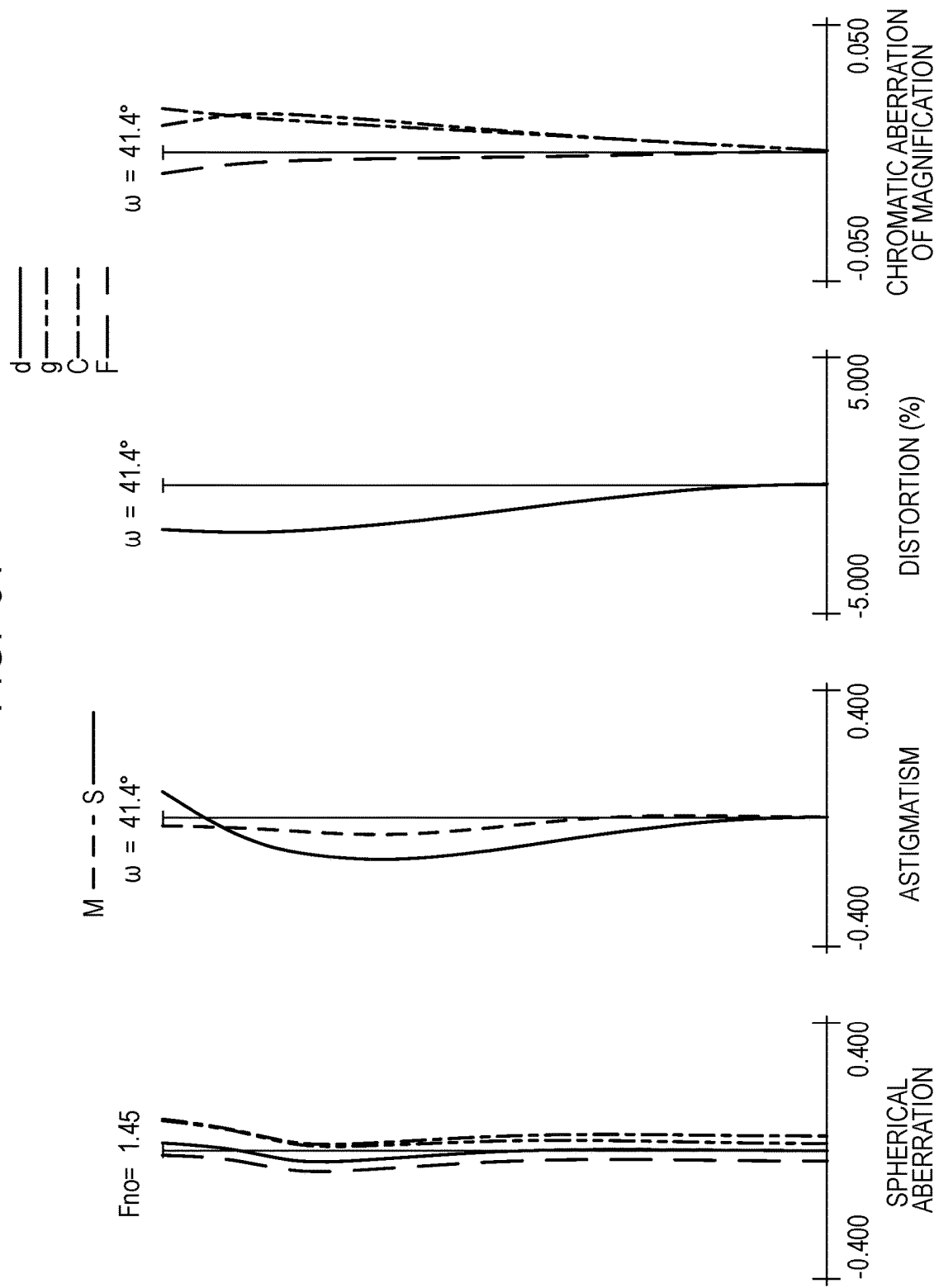
FIG. 31 is a longitudinal aberration diagram of a lens consisting of only an image pickup optical system in Embodiment 9 when in focus at the infinite distance.

FIG. 18 is a longitudinal aberration diagram of the soft focus lens according to Embodiment 9 when in focus at the infinite distance. FIG. 31 is a longitudinal aberration diagram of a lens apparatus consisting of only the first lens unit in Embodiment 9 when in focus at the infinite distance.

As values corresponding to the conditional expressions in Embodiment 9 are shown in Table 1, Embodiment 9 satisfies the expressions (1), (3), (4), and (7) to (11).

Embodiment 10

Figure 19:
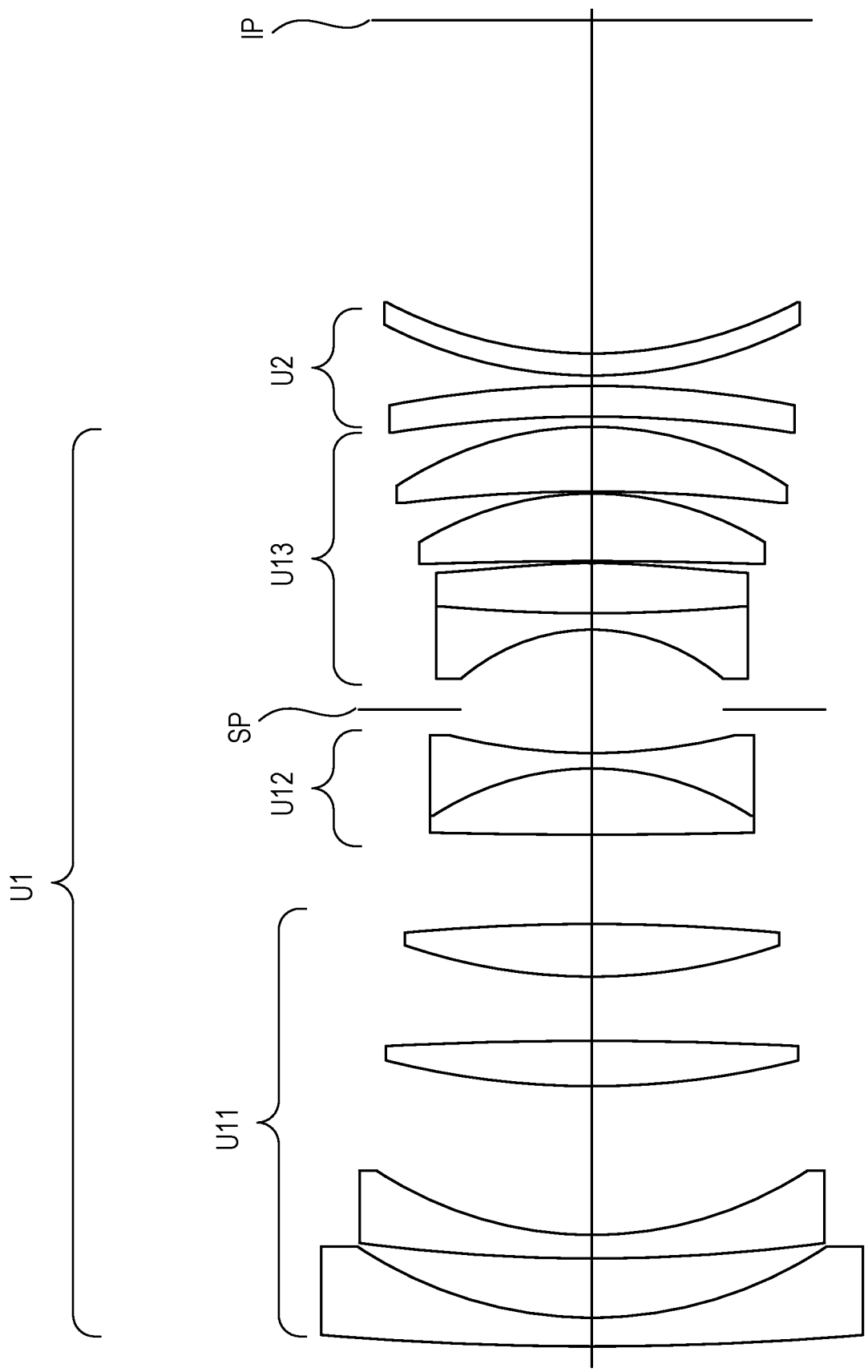
FIG. 19 is a cross-sectional view of a soft focus lens according to Embodiment 10 of the present invention when in focus at an infinite distance.

FIG. 19 is a lens cross-sectional view of a soft focus lens according to Embodiment 10 of the present invention when in focus at an infinite distance object.

In Embodiment 10, specific configurations of a first lens unit (first sub-lens unit U11, a second sub-lens unit U12, and a third sub-lens unit U13) are the same as those in Embodiment 1. A second lens unit (soft focus optical system) U2 in Embodiment 10 consists of, in order from the object side to the image side, the following single lenses: one positive lens and one negative lens. The lenses are a positive meniscus lens having a concave surface on the object side and a negative meniscus lens having a convex surface on the object side. The soft focus lens according to Embodiment 10, which consists of the first lens unit and the second lens unit, has a focal length of 33.1 mm, a half angle of view of 33.2°, and an F-number of 1.40.

Figure 20:
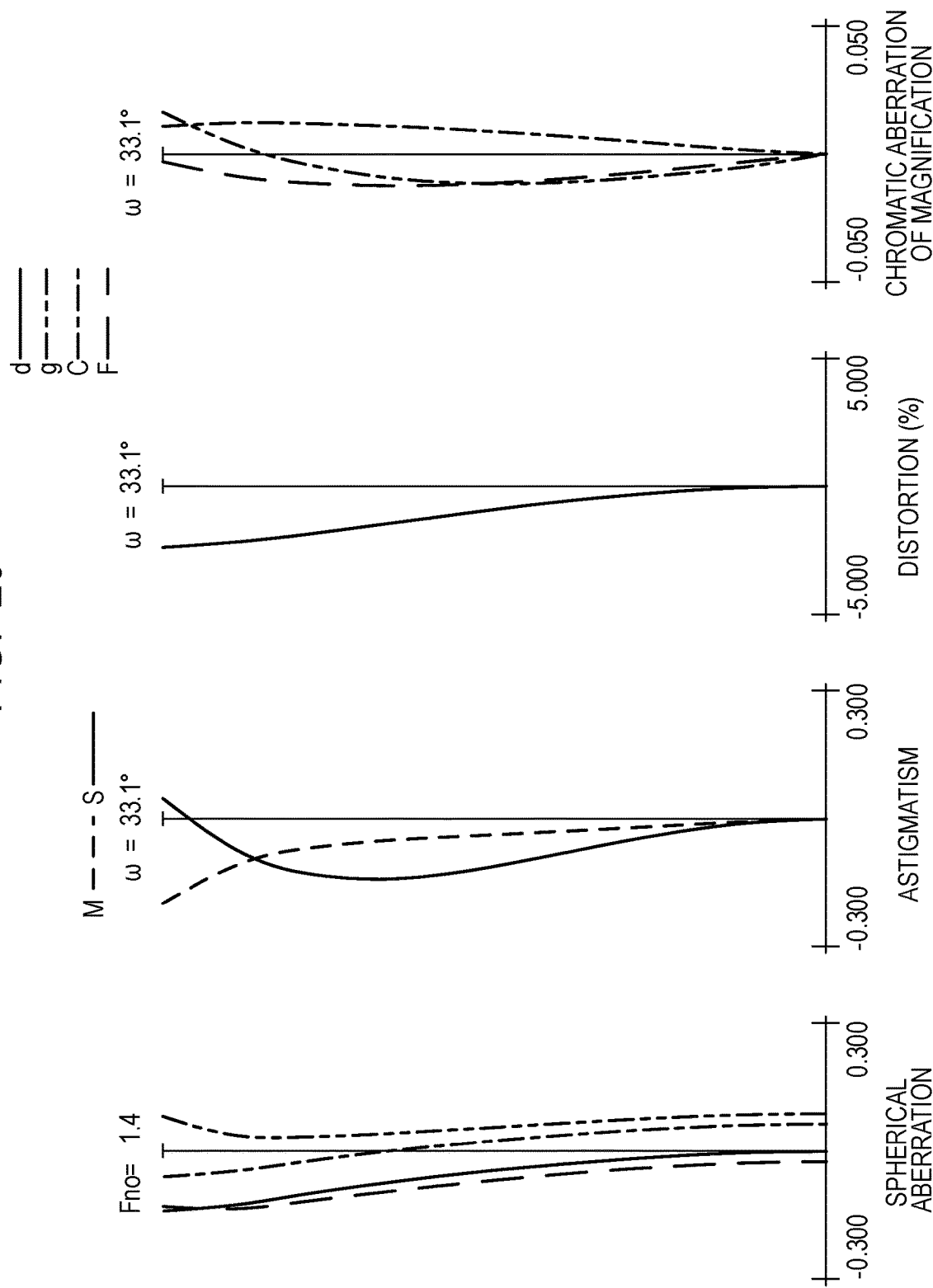
FIG. 20 is a longitudinal aberration diagram of the soft focus lens according to Embodiment 10 when in focus at the infinite distance.

FIG. 20 is a longitudinal aberration diagram of the soft focus lens according to Embodiment 10 when in focus at the infinite distance. FIG. 29 is a longitudinal aberration diagram of a lens apparatus consisting of only the first lens unit in Embodiment 10 when in focus at the infinite distance. The longitudinal aberration diagram of the lens apparatus consisting of only the first lens unit in Embodiment 10 when in focus at the infinite distance, which is illustrated in FIG. 29, is true for Embodiments 1 to 7 and 10 to 14.

As values corresponding to the conditional expressions in Embodiment 10 are shown in Table 1, Embodiment 10 satisfies the expressions (1), (2), (4) to (6), and (8) to (11).

Embodiment 11

Figure 21:
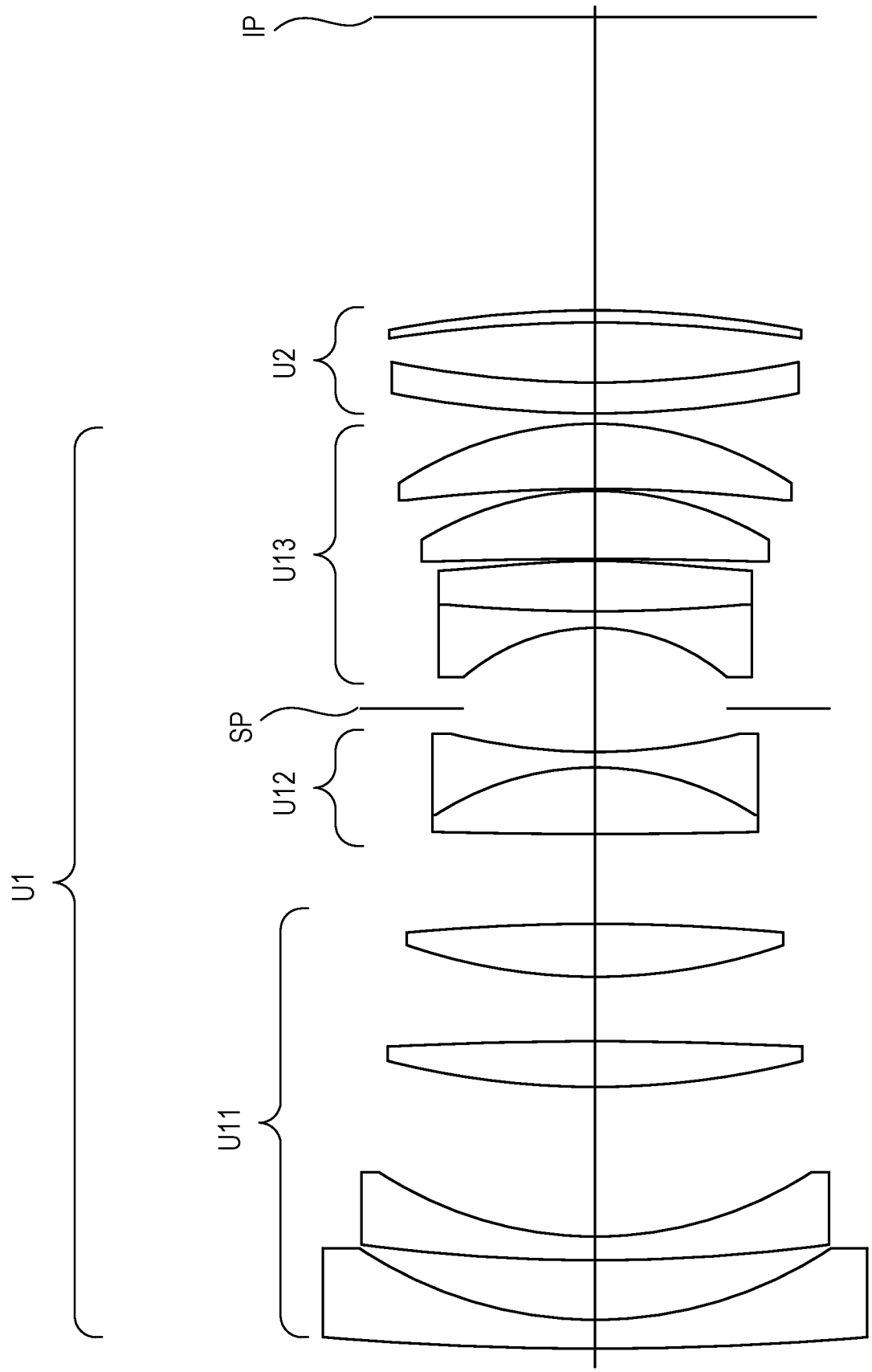
FIG. 21 is a cross-sectional view of a soft focus lens according to Embodiment 11 of the present invention when in focus at an infinite distance.

FIG. 21 is a lens cross-sectional view of a soft focus lens according to Embodiment 11 of the present invention when in focus at an infinite distance object.

In Embodiment 11, specific configurations of a first lens unit (first sub-lens unit U11, a second sub-lens unit U12, and a third sub-lens unit U13) are the same as those in Embodiment 1. A second lens unit (soft focus optical system) U2 in Embodiment 11 consists of, in order from the object side to the image side, the following single lenses: one negative lens and one positive lens. The lenses are a negative meniscus lens having a convex surface on the object side and a positive meniscus lens having a concave surface on the object side. The soft focus lens according to Embodiment 11, which consists of the first lens unit and the second lens unit, has a focal length of 33.1 mm, a half angle of view of 33.2°, and an F-number of 1.40.

Figure 22:
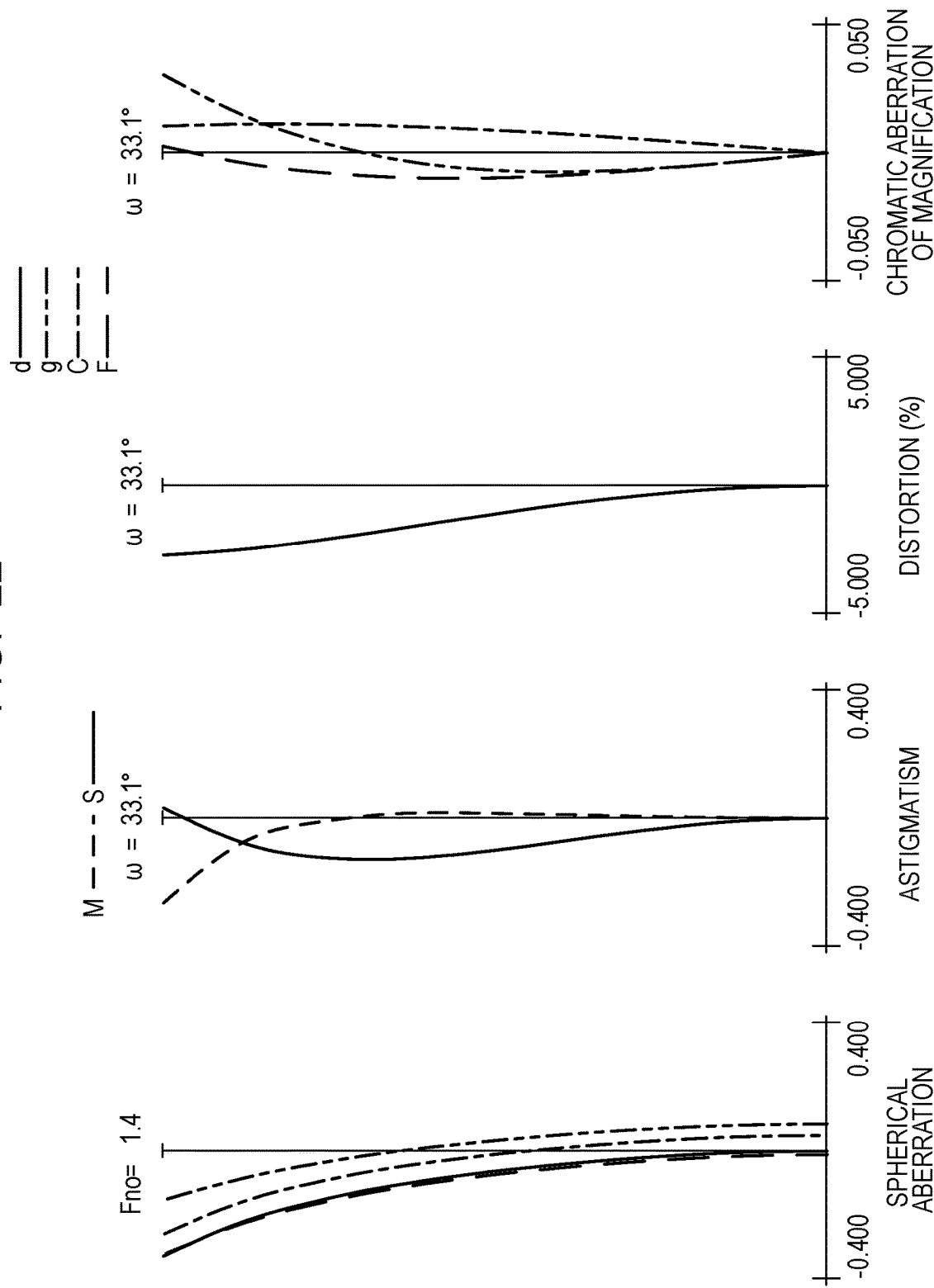
FIG. 22 is a longitudinal aberration diagram of the soft focus lens according to Embodiment 11 when in focus at the infinite distance.

FIG. 22 is a longitudinal aberration diagram of the soft focus lens according to Embodiment 11 when in focus at the infinite distance. FIG. 29 is a longitudinal aberration diagram of a lens apparatus consisting of only the first lens unit in Embodiment 11 when in focus at the infinite distance. The longitudinal aberration diagram of the lens apparatus consisting of only the first lens unit in Embodiment 11 when in focus at the infinite distance, which is illustrated in FIG. 29, is true for Embodiments 1 to 7 and 10 to 14.

As values corresponding to the conditional expressions in Embodiment 11 are shown in Table 1, Embodiment 11 satisfies the expressions (1), (2), (4) to (6), and (8) to (11).

Embodiment 12

Figure 23:
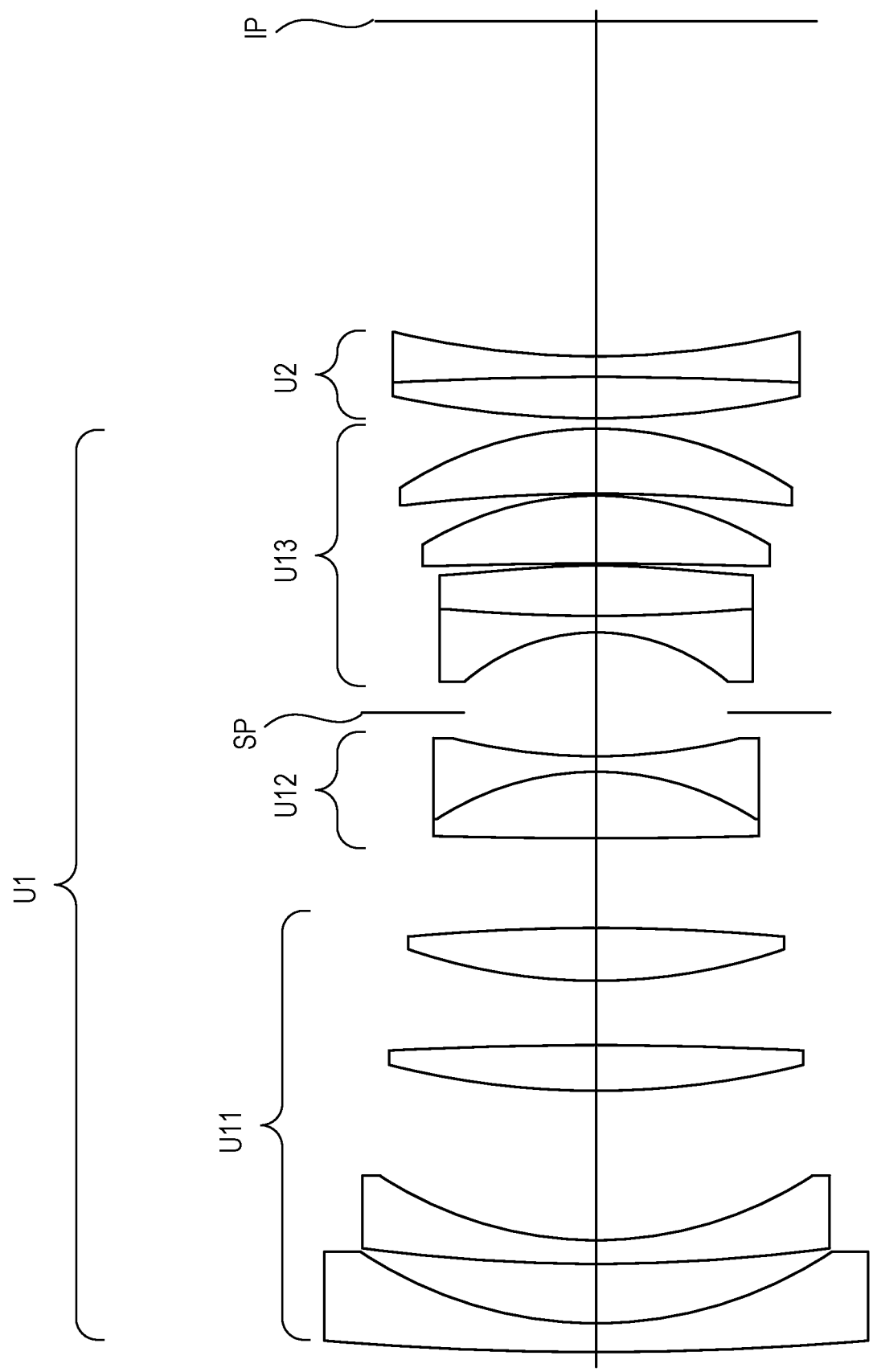
FIG. 23 is a cross-sectional view of a soft focus lens according to Embodiment 12 of the present invention when in focus at an infinite distance.

FIG. 23 is a lens cross-sectional view of a soft focus lens according to Embodiment 12 of the present invention when in focus at an infinite distance object.

In Embodiment 12, specific configurations of a first lens unit (first sub-lens unit U11, a second sub-lens unit U12, and a third sub-lens unit U13) are the same as those in Embodiment 1. A second lens unit (soft focus optical system) U2 in Embodiment 12 consists of a cemented lens of, in order from the object side to the image side, a positive lens and a negative lens. The lenses are a positive lens having a convex surface on the object side and a negative lens having a concave surface on the object side. The soft focus lens according to Embodiment 12, which consists of the first lens unit and the second lens unit, has a focal length of 33.1 mm, a half angle of view of 33.2°, and an F-number of 1.40.

Figure 24:
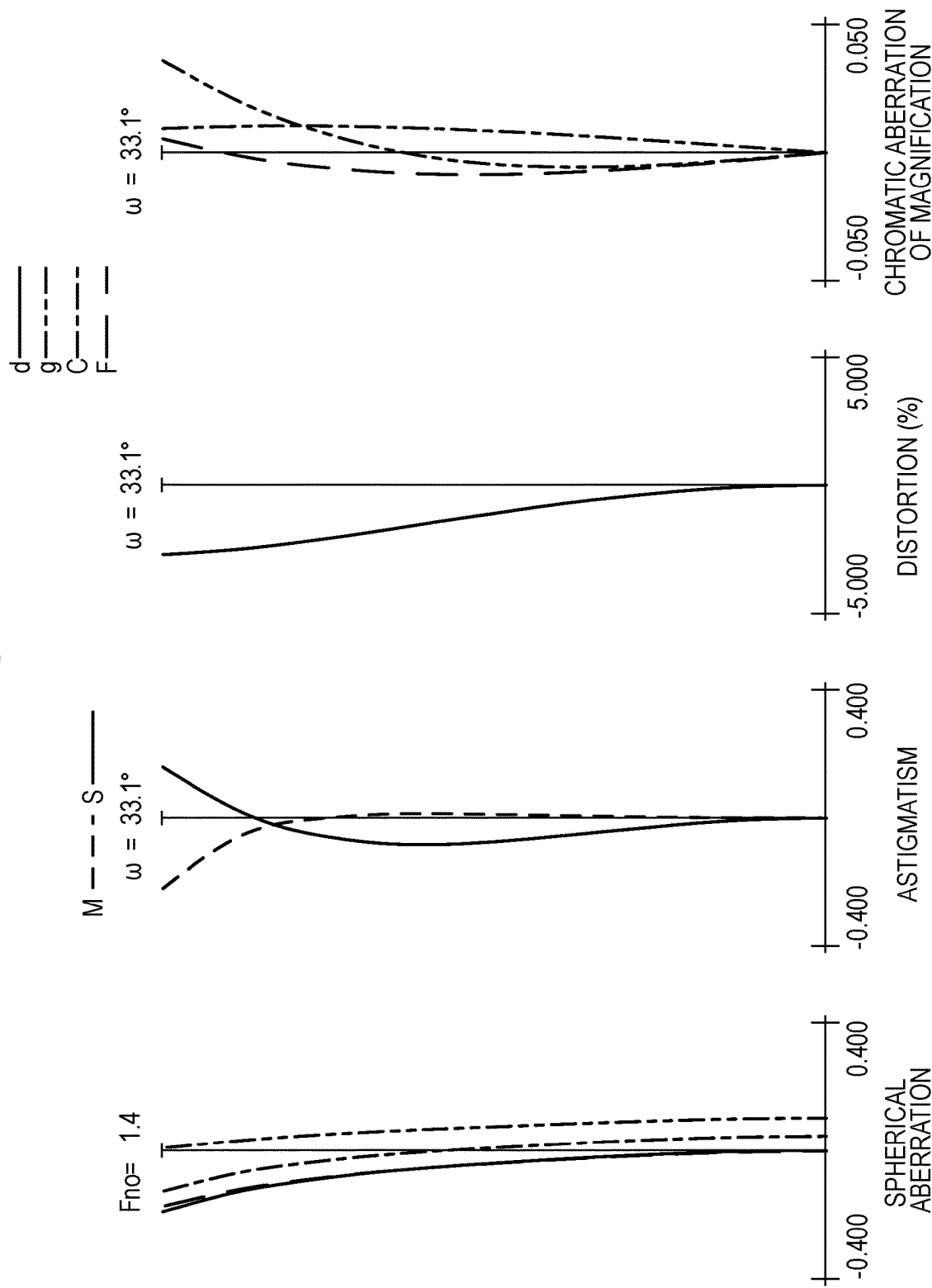
FIG. 24 is a longitudinal aberration diagram of the soft focus lens according to Embodiment 12 when in focus at the infinite distance.

FIG. 24 is a longitudinal aberration diagram of the soft focus lens according to Embodiment 12 when in focus at the infinite distance. FIG. 29 is a longitudinal aberration diagram of a lens apparatus consisting of only the first lens unit in Embodiment 12 when in focus at the infinite distance. The longitudinal aberration diagram of the lens apparatus consisting of only the first lens unit in Embodiment 12 when in focus at the infinite distance, which is illustrated in FIG. 29, is true for Embodiments 1 to 7 and 10 to 14.

As values corresponding to the conditional expressions in Embodiment 12 are shown in Table 1, Embodiment 12 satisfies the expressions (1), (3), (4), and (7) to (11).

Embodiment 13

Figure 25:
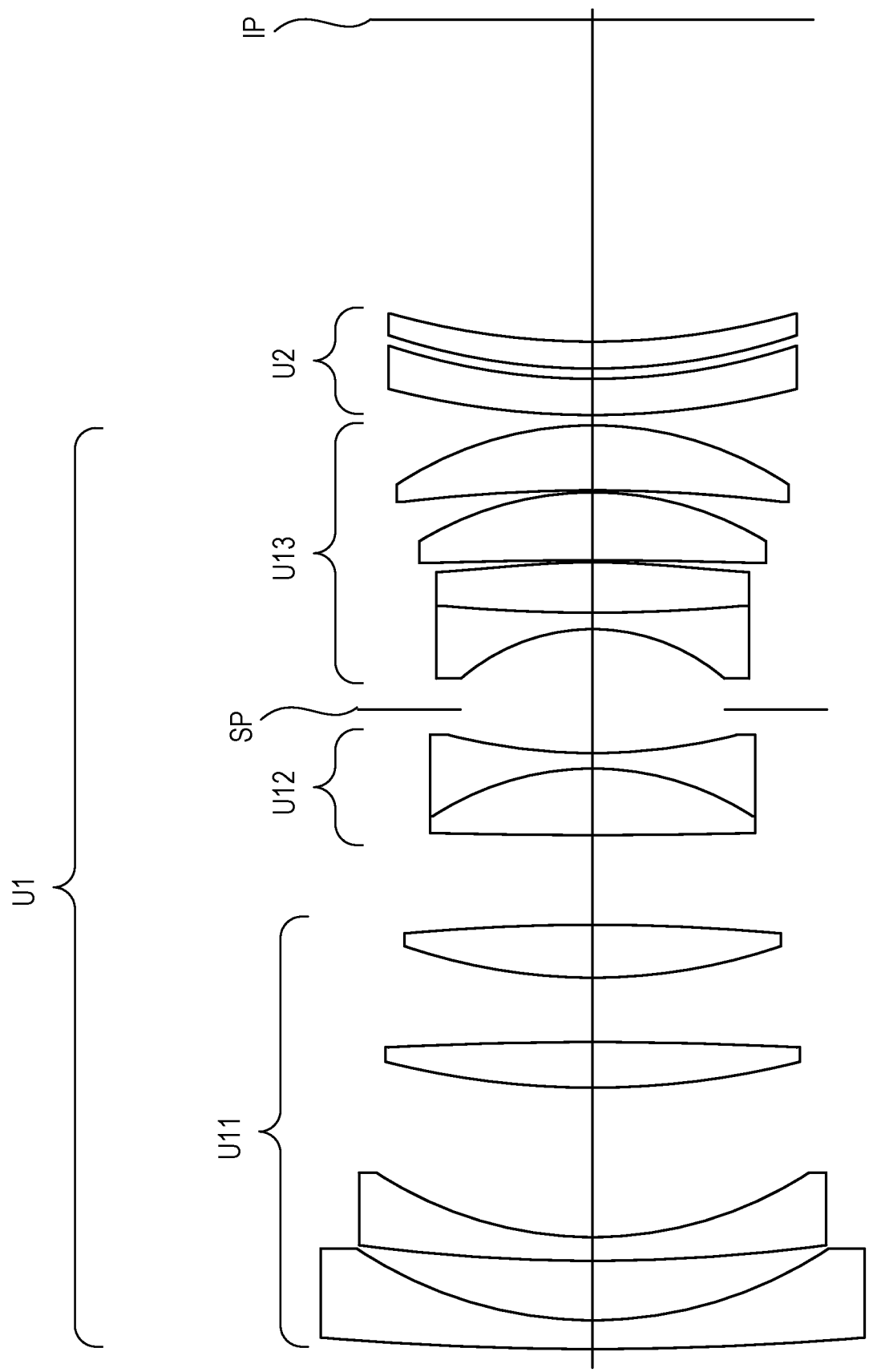
FIG. 25 is a cross-sectional view of a soft focus lens according to Embodiment 13 of the present invention when in focus at an infinite distance.

FIG. 25 is a lens cross-sectional view of a soft focus lens according to Embodiment 13 of the present invention when in focus at an infinite distance object.

In Embodiment 13, specific configurations of a first lens unit (first sub-lens unit U11, a second sub-lens unit U12, and a third sub-lens unit U13) are the same as those in Embodiment 1. A second lens unit (soft focus optical system) U2 in Embodiment 13 consists of, in order from the object side to the image side, the following single lenses: one negative lens and one positive lens. The lenses are a negative lens having a convex surface on the object side and a positive lens having a convex surface on the object side. The soft focus lens according to Embodiment 13, which consists of the first lens unit and the second lens unit, has a focal length of 32.8 mm, a half angle of view of 33.4°, and an F-number of 1.39.

Figure 26:
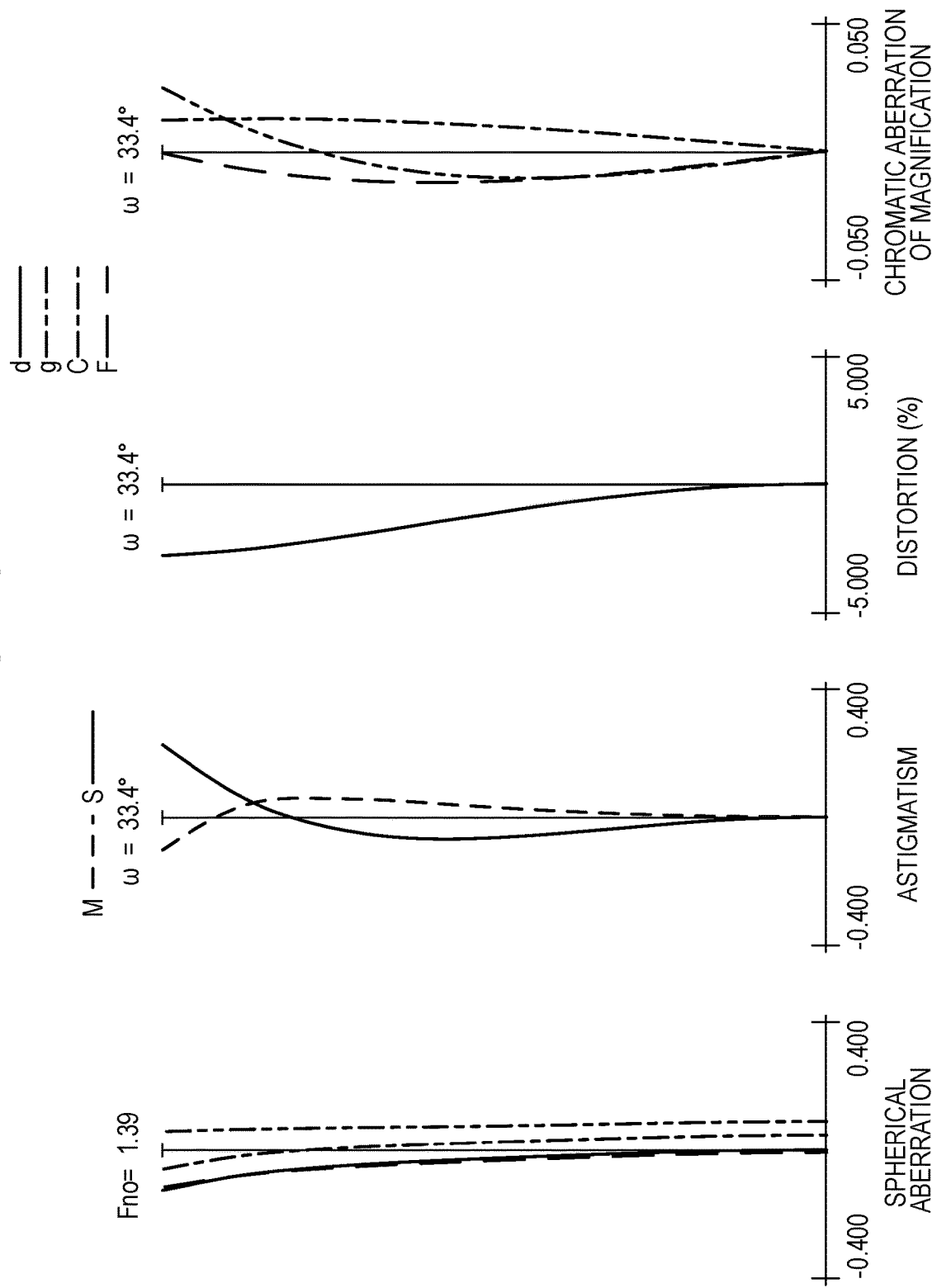
FIG. 26 is a longitudinal aberration diagram of the soft focus lens according to Embodiment 13 when in focus at the infinite distance.

FIG. 26 is a longitudinal aberration diagram of the soft focus lens according to Embodiment 13 when in focus at the infinite distance. FIG. 29 is a longitudinal aberration diagram of a lens apparatus consisting of only the first lens unit in Embodiment 13 when in focus at the infinite distance. The longitudinal aberration diagram of the lens apparatus consisting of only the first lens unit in Embodiment 13 when in focus at the infinite distance, which is illustrated in FIG. 29, is true for Embodiments 1 to 7 and 10 to 14.

As values corresponding to the conditional expressions in Embodiment 13 are shown in Table 1, Embodiment 13 satisfies the expressions (1), (2), (4) to (6), and (8) to (11).

Embodiment 14

Figure 27:
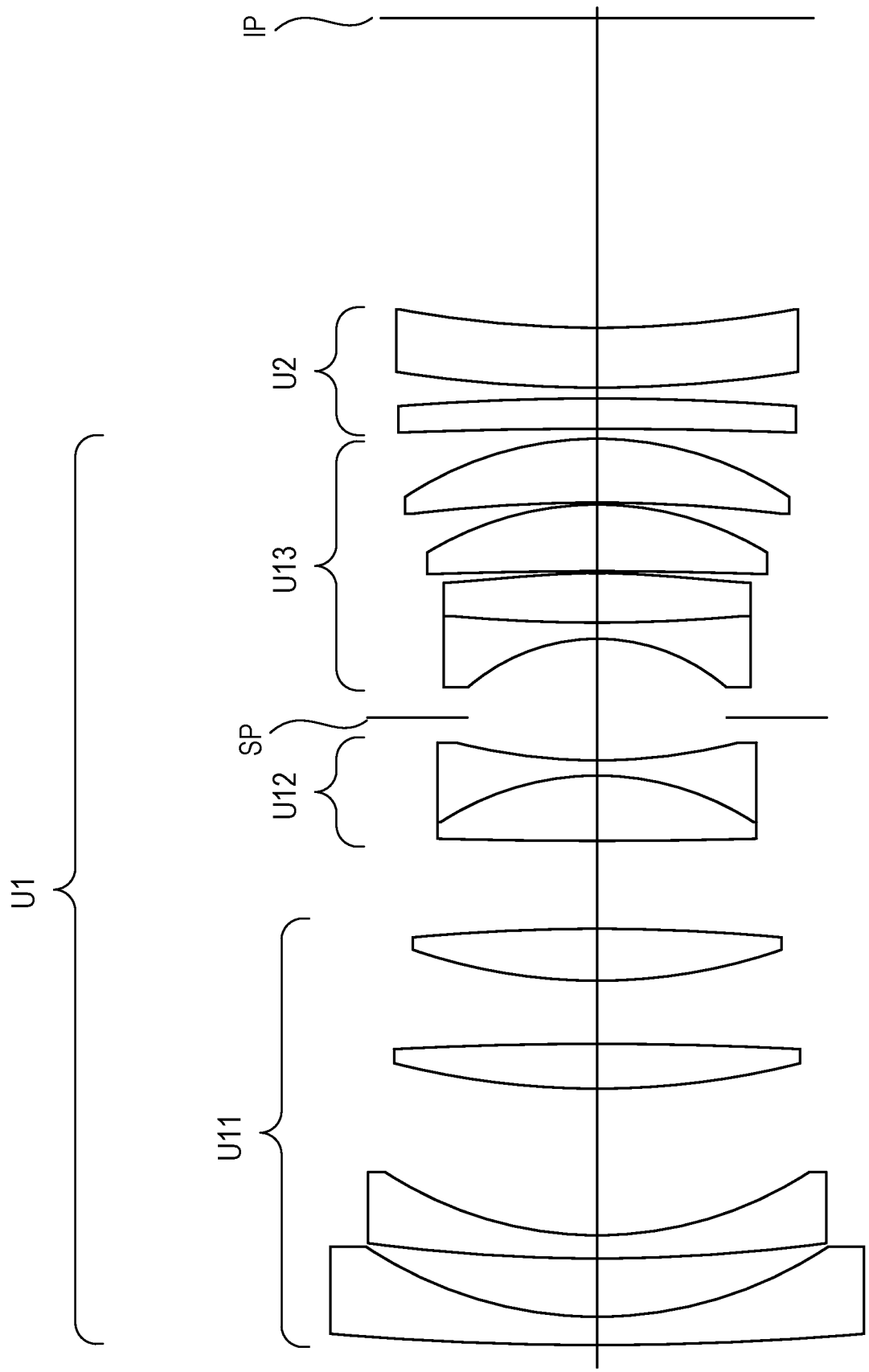
FIG. 27 is a cross-sectional view of a soft focus lens according to Embodiment 14 of the present invention when in focus at an infinite distance.

FIG. 27 is a lens cross-sectional view of a soft focus lens according to Embodiment 14 of the present invention when in focus at an infinite distance object.

In Embodiment 14, specific configurations of a first lens unit (first sub-lens unit U11, a second sub-lens unit U12, and a third sub-lens unit U13) are the same as those in Embodiment 1. A second lens unit (soft focus optical system) U2 in Embodiment 14 consists of, in order from the object side to the image side, the following single lenses: one positive lens and one negative lens. The lenses are a positive lens having a concave surface on the object side and a negative lens having a convex surface on the object side. The soft focus lens according to Embodiment 14, which consists of the first lens unit and the second lens unit, has a focal length of 33.1 mm, a half angle of view of 33.2°, and an F-number of 1.40.

Figure 28:
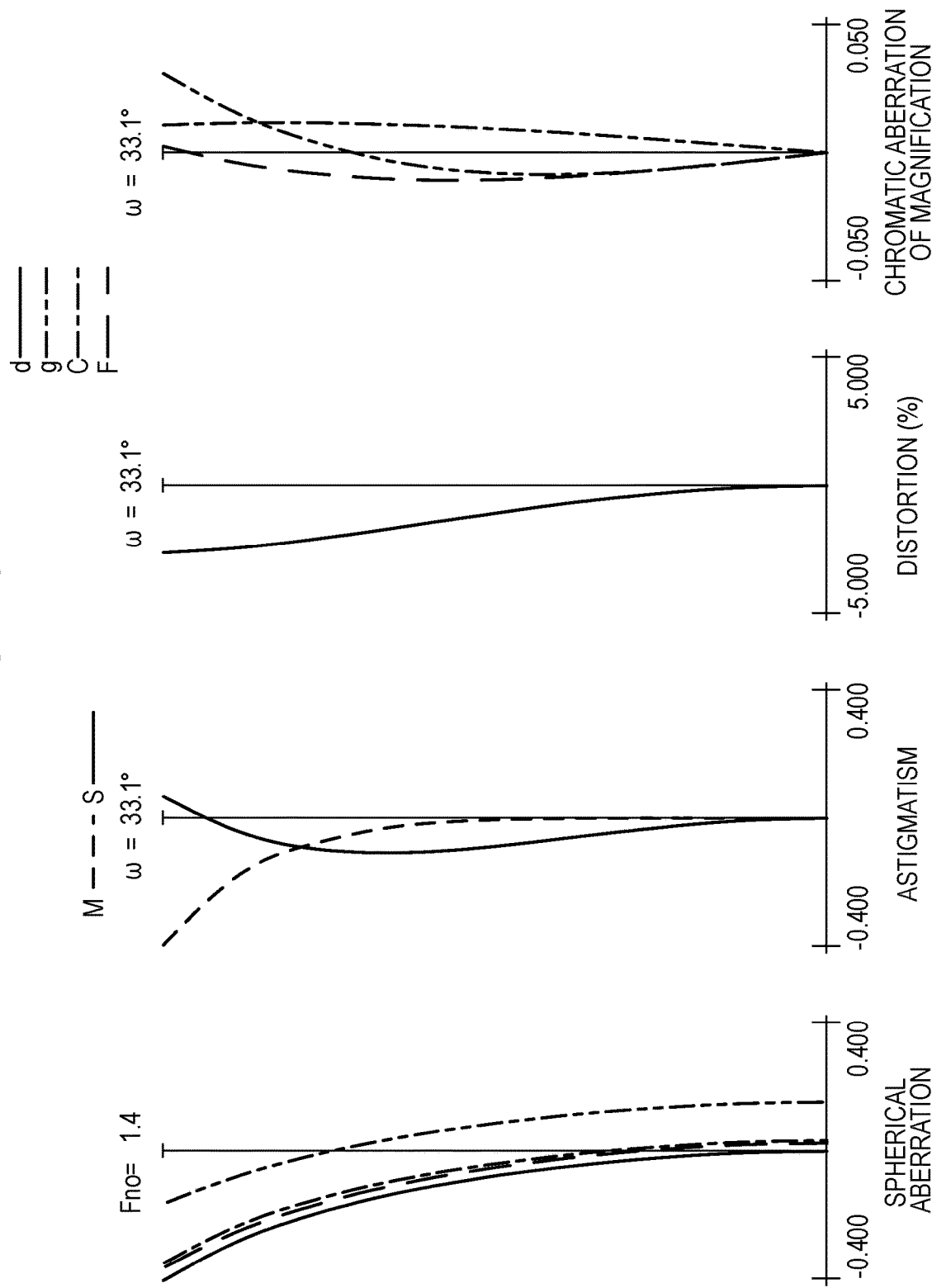
FIG. 28 is a longitudinal aberration diagram of the soft focus lens according to Embodiment 14 when in focus at the infinite distance.

FIG. 28 is a longitudinal aberration diagram of the soft focus lens according to Embodiment 14 when in focus at the infinite distance. FIG. 29 is a longitudinal aberration diagram of a lens apparatus consisting of only the first lens unit in Embodiment 14 when in focus at the infinite distance. The longitudinal aberration diagram of the lens apparatus consisting of only the first lens unit in Embodiment 14 when in focus at the infinite distance, which is illustrated in FIG. 29, is true for Embodiments 1 to 7 and 10 to 14.

As values corresponding to the conditional expressions in Embodiment 14 are shown in Table 1, Embodiment 14 satisfies the expressions (1), (2), (4) to (6), and (8) to (11).

Now, Numerical Embodiments corresponding to Embodiments of the present invention are described. An aspherical shape in Embodiments is expressed by the expression below. Moreover, the values corresponding to the conditional expressions in Embodiments are shown in Table 1. The order of a surface (optical surface) from the object side is represented by "i", a curvature radius of the i-th surface from the object side is represented by "ri", and an interval between the i-th surface and the (i+1)-th surface from the object side (on the optical axis) is represented by "di". Moreover, a refractive index and an Abbe number of a medium (optical member) between the i-th surface and the (i+1)-th surface are represented by "ndi" and "vdi", respectively, and an air-equivalent back focus is represented by BF. When an X axis is set in the optical axis direction, an H axis is set in a direction perpendicular to the optical axis, a direction of travel of light is defined as positive, a paraxial curvature radius is represented by R, a conic constant is represented by K, and aspherical coefficients are represented by A4, A6, A8, A10, and A12, the aspherical shape is expressed by the expression below. Moreover, "e-Z" means "×10$^{-Z}$".

$$X = \frac{(1/R)H^2}{1 + \sqrt{1 - (1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} A11 \cdot H^{11} + A12 \cdot H^{12}$$

In the expression, A3 to A12 represent aspherical coefficients, and the aspherical shape is expressed by a displacement "x" in the optical axis direction with respect to a surface vertex at a position having a height H from the optical axis. Here, R represents a paraxial curvature radius and K represents a conic constant. The asterisk (*) suffixed to the number of a surface number indicates that the surface is an aspherical surface.

Numerical Embodiment 1

| | Unit: mm | | | | |
|---|---|---|---|---|---|
| Surface number i | ri | di | ndi | vdi | Effective diameter |
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |

-continued

| | | | | | |
|---|---|---|---|---|---|
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 45.104 | 2.00 | 1.91082 | 35.3 | 38.38 |
| 21 | 29.184 | 4.64 | 1.59270 | 35.3 | 36.79 |
| 22 | 51.116 | 32.49 | | | 36.58 |
| Image plane | ∞ | | | | |

Aspherical surface data
Fifteenth surface

K = 4.82454e+000    A4 = 1.27386e−005    A6 = 2.46580e−009
A8 = −1.63965e−011    A10 = 1.16481e−014

| | |
|---|---|
| Focal length | 34.20 |
| F-number | 1.45 |
| Half angle of view | 32.32 |
| Image height | 21.64 |
| Total length | 129.93 |
| BF | 32.49 |
| Entrance pupil position | 35.84 |
| Exit pupil position | −44.66 |
| Front principal point position | 54.88 |
| Rear principal point position | −1.71 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −664.45 | 6.64 | 38.36 | 32.49 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −96.55 |
| 12 | 21 | 106.38 |

Numerical Embodiment 2

Unit: mm

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |

-continued

| | | | | | |
|---|---|---|---|---|---|
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 47.451 | 2.00 | 1.91082 | 35.3 | 38.45 |
| 21 | 32.487 | 0.48 | | | 37.14 |
| 22 | 32.772 | 4.01 | 1.59270 | 35.3 | 37.52 |
| 23 | 52.983 | 32.76 | | | 37.29 |
| Image plane | ∞ | | | | |

Aspherical surface data
Fifteenth surface

K = 4.82454e+000   A4 = 1.27386e−005   A6 = 2.46580e−009
A8 = −1.63965e−011   A10 = 1.16481e−014

| | |
|---|---|
| Focal length | 34.20 |
| F-number | 1.45 |
| Half angle of view | 32.32 |
| Image height | 21.64 |
| Total length | 130.05 |
| BF | 32.76 |
| Entrance pupil position | 35.84 |
| Exit pupil position | −46.11 |
| Front principal point position | 55.21 |
| Rear principal point position | −1.44 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −817.67 | 6.49 | 38.36 | 32.75 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −120.79 |
| 12 | 22 | 134.98 |

Numerical Embodiment 3

Unit: mm

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |

-continued

| | | | | | |
|---|---|---|---|---|---|
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 72.372 | 1.99 | 1.57250 | 57.7 | 38.35 |
| 21 | 60.970 | 1.49 | | | 38.06 |
| 22 | 89.543 | 1.99 | 1.43875 | 94.7 | 38.16 |
| 23 | 112.378 | 33.71 | | | 38.17 |
| Image plane | ∞ | | | | |

Aspherical surface data
Fifteenth surface

K = 4.82454e+000    A4 = 1.27386e−005    A6 = 2.46580e−009
A8 = −1.63965e−011    A10 = 1.16481e−014

| | |
|---|---|
| Focal length | 34.20 |
| F-number | 1.45 |
| Half angle of view | 32.32 |
| Image height | 21.64 |
| Total length | 129.98 |
| BF | 33.71 |
| Entrance pupil position | 35.84 |
| Exit pupil position | −50.77 |
| Front principal point position | 56.19 |
| Rear principal point position | −0.49 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −2,639.96 | 5.47 | 38.36 | 33.71 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −721.84 |
| 12 | 22 | 978.31 |

Numerical Embodiment 4

Unit: mm

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |

-continued

| | | | | | |
|---|---|---|---|---|---|
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 69.471 | 1.99 | 1.43875 | 94.7 | 38.36 |
| 21 | 58.444 | 1.88 | | | 38.15 |
| 22 | 101.252 | 1.99 | 1.51633 | 64.1 | 38.25 |
| 23 | 118.838 | 33.32 | | | 38.23 |
| Image plane | ∞ | | | | |

Aspherical surface data
Fifteenth surface

K = 4.82454e+000   A4 = 1.27386e−005   A6 = 2.46580e−009
A8 = −1.63965e−011   A10 = 1.16481e−014

| | |
|---|---|
| Focal length | 34.20 |
| F-number | 1.45 |
| Half angle of view | 32.32 |
| Image height | 21.64 |
| Total length | 129.98 |
| BF | 33.32 |
| Entrance pupil position | 35.84 |
| Exit pupil position | −51.34 |
| Front principal point position | 56.22 |
| Rear principal point position | −0.88 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −2,825.68 | 5.86 | 38.36 | 33.32 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −888.07 |
| 12 | 22 | 1,275.91 |

Numerical Embodiment 5

| | | Unit: mm | | | |
|---|---|---|---|---|---|
| Surface number i | ri | di | ndi | vdi | Effective diameter |
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 3.25 | | | 37.18 |
| 20 | 51.242 | 5.47 | 1.91082 | 35.3 | 39.07 |
| 21 | 28.398 | 5.52 | 1.59270 | 35.3 | 36.57 |
| 22 | 64.284 | 25.86 | | | 36.50 |
| Image plane | ∞ | | | | |

| Aspherical surface data Fifteenth surface | | |
|---|---|---|
| K = 4.82454e+000 | A4 = 1.27386e−005 | A6 = 2.46580e−009 |
| A8 = −1.63965e−011 | A10 = 1.16481e−014 | |

| | |
|---|---|
| Focal length | 32.83 |
| F-number | 1.39 |
| Half angle of view | 33.38 |
| Image height | 21.64 |
| Total length | 129.90 |
| BF | 25.86 |
| Entrance pupil position | 35.84 |
| Exit pupil position | −46.25 |
| Front principal point position | 53.72 |
| Rear principal point position | −6.98 |

| | | Lens unit data | | | |
|---|---|---|---|---|---|
| Unit | First surface | Focal length | Lens structure length | Front principal point position | Rear principal point position |
| 1 | 1 | 34.20 | 89.80 | 56.64 | 5.15 |
| 2 | 20 | −724.96 | 10.99 | 66.31 | 54.85 |

| Single lens data | | |
|---|---|---|
| Lens | First surface | Focal length |
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −78.95 |
| 12 | 21 | 81.18 |

Numerical Embodiment 6

Unit: mm

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 0.99 | | | 37.18 |
| 20 | 46.067 | 1.99 | 1.91082 | 35.3 | 37.91 |
| 21 | 28.179 | 4.74 | 1.59270 | 35.3 | 36.21 |
| 22 | 50.131 | 33.83 | | | 36.00 |
| Image plane | ∞ | | | | |

Aspherical surface data
Fifteenth surface

K = 4.82454e+000　A4 = 1.27386e−005　A6 = 2.46580e−009
A8 = −1.63965e−011　A10 = 1.16481e−014

| | |
|---|---|
| Focal length | 35.57 |
| F-number | 1.51 |
| Half angle of view | 31.31 |
| Image height | 21.64 |
| Total length | 131.35 |
| BF | 33.83 |
| Entrance pupil position | 35.84 |
| Exit pupil position | −42.79 |
| Front principal point position | 54.89 |
| Rear principal point position | −1.74 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −390.95 | 6.73 | 23.33 | 18.19 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −84.14 |
| 12 | 21 | 100.50 |

Numerical Embodiment 7

Unit: mm

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 11.00 | | | 37.18 |
| 20 | 52.291 | 1.96 | 1.91082 | 35.3 | 39.43 |
| 21 | 28.003 | 6.18 | 1.59270 | 35.3 | 37.71 |
| 22 | 69.587 | 22.21 | | | 37.65 |
| Image plane | ∞ | | | | |

Aspherical surface data
Fifteenth surface

K = 4.82454e+000　A4 = 1.27386e−005　A6 = 2.46580e−009
A8 = −1.63965e−011　A10 = 1.16481e−014

| | |
|---|---|
| Focal length | 34.20 |
| F-number | 1.45 |
| Half angle of view | 32.32 |
| Image height | 21.64 |
| Total length | 131.15 |
| BF | 22.21 |
| Entrance pupil position | 35.84 |
| Exit pupil position | −52.67 |
| Front principal point position | 54.42 |
| Rear principal point position | −11.99 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | −526.93 | 8.14 | 28.36 | 22.21 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −68.84 |
| 12 | 21 | 74.92 |

Numerical Embodiment 8

Unit: mm

Surface data

| Surface number i | ri | di | ndi | vdi | Effective diameter |
|---|---|---|---|---|---|
| 1 | 131.189 | 10.84 | 1.48749 | 70.2 | 67.28 |
| 2 | −264.579 | 0.90 | | | 65.55 |
| 3 | 53.910 | 9.80 | 1.49700 | 81.5 | 58.63 |
| 4 | 260.718 | 3.20 | | | 56.87 |
| 5 | −623.694 | 3.80 | 1.83400 | 37.2 | 55.96 |
| 6 | 105.942 | 2.53 | | | 52.76 |
| 7 | 63.907 | 8.04 | 1.49700 | 81.5 | 51.28 |
| 8 | −609.143 | 0.20 | | | 50.19 |
| 9 | 27.722 | 3.23 | 1.71736 | 29.5 | 41.68 |
| 10 | 23.809 | 12.30 | | | 37.63 |
| 11 (Stop) | ∞ | 3.97 | | | 35.42 |
| 12 | −1,002.290 | 5.00 | 1.84666 | 23.9 | 32.68 |
| 13 | −65.695 | 1.78 | 1.71999 | 50.2 | 31.54 |
| 14 | 39.690 | 21.66 | | | 28.83 |
| 15 | −34.937 | 2.72 | 1.74077 | 27.8 | 25.92 |
| 16 | 130.139 | 8.68 | 1.77250 | 49.6 | 30.09 |
| 17 | −43.302 | 0.50 | | | 33.26 |
| 18 | 97.410 | 5.67 | 1.83400 | 37.2 | 36.69 |
| 19 | −205.341 | 15.00 | | | 37.11 |
| 20 | 45.104 | 2.00 | 1.91082 | 35.3 | 39.19 |
| 21 | 29.184 | 4.64 | 1.59270 | 35.3 | 37.47 |
| 22 | 51.116 | 33.12 | | | 37.25 |
| Image plane | ∞ | | | | |

| | |
|---|---|
| Focal length | 131.10 |
| F-number | 2.06 |
| Half angle of view | 9.37 |
| Image height | 21.64 |
| Total length | 159.60 |
| BF | 33.12 |
| Entrance pupil position | 74.80 |
| Exit pupil position | −93.60 |
| Front principal point position | 70.27 |
| Rear principal point position | −97.98 |

Lens unit data

| Unit | First surface | Focal length | Lens structure length | Front principal point position | Rear principal point position |
|---|---|---|---|---|---|
| 1 | 1 | 130.98 | 104.83 | 95.99 | −76.99 |
| 2 | 20 | −664.45 | 6.64 | 38.36 | 32.49 |

Single lens data

| Lens | First surface | Focal length |
|---|---|---|
| 1 | 1 | 181.54 |
| 2 | 3 | 134.63 |
| 3 | 5 | −108.33 |
| 4 | 7 | 116.84 |
| 5 | 9 | −358.95 |
| 6 | 12 | 82.83 |
| 7 | 13 | −34.12 |
| 8 | 15 | −36.92 |
| 9 | 16 | 43.00 |
| 10 | 18 | 79.90 |
| 11 | 20 | −96.55 |
| 12 | 21 | 106.38 |

Numerical Embodiment 9

Unit: mm

Surface data

| Surface number i | ri | di | ndi | vdi | Effective diameter |
|---|---|---|---|---|---|
| 1 | 61.880 | 2.99 | 1.83481 | 42.7 | 53.51 |
| 2 | 27.026 | 8.34 | | | 43.12 |
| 3 | 71.747 | 3.00 | 1.58313 | 59.4 | 42.60 |
| 4* | 25.706 | 6.93 | | | 38.31 |
| 5 | 92.706 | 4.95 | 1.88300 | 40.8 | 38.05 |
| 6 | −127.713 | 0.70 | | | 37.62 |
| 7 | −97.467 | 2.50 | 1.49700 | 81.5 | 37.37 |
| 8 | 39.023 | 5.83 | 1.83481 | 42.7 | 34.09 |
| 9 | −1,070.546 | 3.79 | | | 33.21 |
| 10 | 46.333 | 5.98 | 1.83481 | 42.7 | 27.09 |
| 11 | −47.248 | 1.90 | 1.54814 | 45.8 | 25.70 |
| 12 | 21.482 | 5.07 | | | 23.11 |
| 13 | −53.687 | 1.40 | 1.65412 | 39.7 | 23.16 |
| 14 | 197.561 | 0.15 | | | 23.89 |
| 15 | 29.239 | 6.73 | 1.43387 | 95.1 | 25.18 |
| 16 | −44.333 | 2.59 | | | 25.23 |
| 17 (Stop) | ∞ | 7.21 | | | 24.22 |
| 18 | −17.904 | 3.78 | 1.60311 | 60.6 | 23.59 |
| 19 | −15.383 | 2.15 | 1.80518 | 25.4 | 24.60 |
| 20 | −48.206 | 0.25 | | | 28.76 |
| 21 | 97.922 | 8.54 | 1.61800 | 63.3 | 31.58 |
| 22 | −29.308 | 0.25 | | | 33.17 |
| 23* | −162.434 | 5.28 | 1.80400 | 46.6 | 34.55 |
| 24 | −36.488 | 0.20 | | | 36.02 |
| 25 | 45.104 | 2.00 | 1.91082 | 35.3 | 37.41 |
| 26 | 29.184 | 4.64 | 1.59270 | 35.3 | 35.97 |
| 27 | 51.116 | 32.73 | | | 35.77 |
| Image plane | ∞ | | | | |

Aspherical surface data

Fourth surface

K = 0.00000e+000  A4 = −5.57660e−006  A6 = −9.40593e−009
A8 = 5.84881e−012  A10 = −3.17028e−014

Twenty-third surface

K = 0.00000e+000  A4 = −1.09975e−005  A6 = −1.48146e−009
A8 = −9.36205e−012  A10 = −5.31145e−015

| | |
|---|---|
| Focal length | 24.56 |
| F-number | 1.45 |
| Half angle of view | 41.38 |
| Image height | 21.64 |
| Total length | 129.88 |
| BF | 32.73 |
| Entrance pupil position | 29.97 |
| Exit pupil position | −50.42 |
| Front principal point position | 47.28 |
| Rear principal point position | 8.17 |

Lens unit data

| Unit | First surface | Focal length | Lens structure length | Front principal point position | Rear principal point position |
|---|---|---|---|---|---|
| 1 | 1 | 24.55 | 90.31 | 48.18 | 14.25 |
| 2 | 25 | −664.45 | 6.64 | 38.36 | 32.49 |

Single lens data

| Lens | First surface | Focal length |
|---|---|---|
| 1 | 1 | −59.81 |
| 2 | 3 | −70.39 |
| 3 | 5 | 61.48 |
| 4 | 7 | −55.73 |
| 5 | 8 | 45.21 |

-continued

Unit: mm

| | | |
|---|---|---|
| 6 | 10 | 28.86 |
| 7 | 11 | −26.68 |
| 8 | 13 | −64.40 |
| 9 | 15 | 41.76 |
| 10 | 18 | 115.85 |
| 11 | 19 | −28.90 |
| 12 | 21 | 37.46 |
| 13 | 23 | 57.46 |
| 14 | 25 | −96.55 |
| 15 | 26 | 106.38 |

Numerical Embodiment 10

Unit: mm

Surface data

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | −123.706 | 3.00 | 1.49700 | 81.5 | 38.04 |
| 21 | −105.297 | 1.00 | | | 38.61 |
| 22 | 44.595 | 2.15 | 1.49700 | 81.5 | 39.62 |
| 23 | 43.516 | 32.56 | | | 39.12 |
| Image plane | ∞ | | | | |

Aspherical surface data
Fifteenth surface

K = 4.82454e+000　　A4 = 1.27386e−005　　A6 = 2.46580e−009
A8 = −1.63965e−011　　A10 = 1.16481e−014

| | |
|---|---|
| Focal length | 33.13 |
| F-number | 1.40 |
| Half angle of view | 33.15 |
| Image height | 21.64 |
| Total length | 129.51 |
| BF | 32.56 |
| Entrance pupil position | 35.84 |
| Exit pupil position | −54.17 |
| Front principal point position | 56.31 |
| Rear principal point position | −0.57 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | 1,519.68 | 6.15 | −10.73 | −14.99 |

-continued

Unit: mm

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | 1,350.65 |
| 12 | 22 | −10,660.90 |

Numerical Embodiment 11

Unit: mm

Surface data

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 102.297 | 3.00 | 1.49700 | 81.5 | 38.59 |
| 21 | 101.091 | 5.83 | | | 38.53 |
| 22 | −132.679 | 1.17 | 1.49700 | 81.5 | 38.96 |
| 23 | −107.749 | 28.47 | | | 39.13 |
| Image plane | ∞ | | | | |

Aspherical surface data
Fifteenth surface

K = 4.82454e+000　　A4 = 1.27386e−005　　A6 = 2.46580e−009
A8 = −1.63965e−011　　A10 = 1.16481e−014

| | |
|---|---|
| Focal length | 33.13 |
| F-number | 1.40 |
| Half angle of view | 33.15 |
| Image height | 21.64 |
| Total length | 129.28 |
| BF | 28.47 |
| Entrance pupil position | 35.84 |
| Exit pupil position | −59.87 |
| Front principal point position | 56.54 |
| Rear principal point position | −4.66 |

-continued

Unit: mm

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | 1,160.58 | 10.01 | 0.87 | −7.84 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −98,690.69 |
| 12 | 22 | 1,136.04 |

Numerical Embodiment 12

Unit: mm

Surface data

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 93.540 | 4.03 | 1.62041 | 60.3 | 38.61 |
| 21 | −359.961 | 2.00 | 1.56883 | 56.4 | 38.52 |
| 22 | 84.233 | 32.58 | | | 38.21 |
| Image plane | ∞ | | | | |

Aspherical surface data
Fifteenth surface

K = 4.82454e+000   A4 = 1.27386e−005   A6 = 2.46580e−009
A8 = −1.63965e−011   A10 = 1.16481e−014

| Focal length | 33.13 |
|---|---|
| F-number | 1.40 |
| Half angle of view | 33.15 |
| Image height | 21.64 |
| Total length | 129.41 |
| BF | 32.58 |
| Entrance pupil position | 35.84 |

-continued

Unit: mm

| Exit pupil position | −50.66 |
|---|---|
| Front principal point position | 55.78 |
| Rear principal point position | −0.55 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | 5,264.68 | 6.02 | −131.68 | −132.13 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | 120.08 |
| 12 | 21 | −119.80 |

Numerical Embodiment 13

Unit: mm

Surface data

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | 80.113 | 3.51 | 1.59270 | 35.3 | 38.79 |
| 21 | 63.512 | 1.00 | | | 38.47 |
| 22 | 63.512 | 2.62 | 1.88300 | 40.8 | 38.74 |
| 23 | 73.529 | 31.27 | | | 38.39 |
| Image plane | ∞ | | | | |

Aspherical surface data
Fifteenth surface

K = 4.82454e+000   A4 = 1.27386e−005   A6 = 2.46580e−009
A8 = −1.63965e−011   A10 = 1.16481e−014

| Focal length | 32.83 |
|---|---|
| F-number | 1.39 |

-continued

Unit: mm

| | | |
|---|---|---|
| Half angle of view | 33.38 | |
| Image height | 21.64 | |
| Total length | 129.21 | |
| BF | 31.27 | |
| Entrance pupil position | 35.84 | |
| Exit pupil position | −51.12 | |
| Front principal point position | 55.59 | |
| Rear principal point position | −1.56 | |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | 3,520.55 | 7.13 | −108.33 | −109.55 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | −561.33 |
| 12 | 22 | 470.32 |

Numerical Embodiment 14

Unit: mm

Surface data

| Surface number i | ri | di | ndi | vdi | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12 (Stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 1.00 | | | 37.18 |
| 20 | −506.331 | 3.00 | 1.75500 | 52.3 | 38.20 |
| 21 | −258.257 | 1.07 | | | 38.53 |
| 22 | 129.636 | 5.93 | 2.00330 | 28.3 | 38.89 |
| 23 | 108.301 | 30.70 | | | 38.29 |
| Image plane | ∞ | | | | |

Aspherical surface data
Fifteenth surface

K = 4.82454e+000   A4 = 1.27386e−005   A6 = 2.46580e−009
A8 = −1.63965e−011   A10 = 1.16481e−014

| | |
|---|---|
| Focal length | 33.13 |
| F-number | 1.40 |
| Half angle of view | 33.15 |
| Image height | 21.64 |
| Total length | 131.51 |
| BF | 30.70 |
| Entrance pupil position | 35.84 |
| Exit pupil position | −52.37 |
| Front principal point position | 55.75 |
| Rear principal point position | −2.43 |

Lens unit data

| Unit | First surface | Focal length | Lens structure length | Front principal point position | Rear principal point position |
|---|---|---|---|---|---|
| 1 | 1 | 34.20 | 89.80 | 56.64 | 5.15 |
| 2 | 20 | 6,036.00 | 10.00 | −156.59 | −158.14 |

Single lens data

| Lens | First surface | Focal length |
|---|---|---|
| 1 | 1 | −93.89 |
| 2 | 3 | −97.84 |
| 3 | 5 | 89.40 |
| 4 | 7 | 58.02 |
| 5 | 9 | 35.85 |
| 6 | 10 | −29.18 |
| 7 | 13 | −21.85 |
| 8 | 14 | 62.49 |
| 9 | 16 | 45.35 |
| 10 | 18 | 57.18 |
| 11 | 20 | 694.55 |
| 12 | 22 | −762.03 |

TABLE 1

Values corresponding to conditional expressions in Numerical Embodiments 1 to 14

| Conditional Expression No. | Numerical Embodiment 1 | Numerical Embodiment 2 | Numerical Embodiment 3 | Numerical Embodiment 4 | Numerical Embodiment 5 | Numerical Embodiment 6 | Numerical Embodiment 7 |
|---|---|---|---|---|---|---|---|
| (1) | 1.000 | 1.000 | 1.000 | 1.000 | 0.960 | 1.040 | 1.000 |
| (2) | −0.1823 | −0.1148 | −0.0027 | −0.0017 | −0.2921 | −0.2214 | −0.3630 |
| (3) | −0.908 | −0.895 | | | −0.973 | −0.837 | −0.919 |
| (4) | −0.000544 | −0.000544 | −0.000544 | −0.000544 | −0.000568 | −0.000523 | −0.000544 |
| (5) | 4.666 | 5.342 | 11.694 | 11.600 | 3.486 | 4.151 | 3.306 |
| (6) | 3.661 | 4.243 | 8.842 | 12.515 | 2.583 | 3.567 | 2.347 |
| (7) | 16.006 | 18.155 | | | 8.858 | 23.666 | 7.047 |
| (8) | 1.200 | 1.200 | 1.093 | 0.949 | 1.200 | 1.200 | 1.200 |

TABLE 1-continued

Values corresponding to conditional expressions in Numerical Embodiments 1 to 14

| | | | | | | | |
|---|---|---|---|---|---|---|---|
| (9) | −0.002321 | −0.001978 | −0.000980 | −0.000917 | −0.004139 | −0.001859 | −0.002272 |
| (10) | 0.025 | 0.025 | 0.025 | 0.025 | 0.081 | 0.024 | 0.266 |
| (11) | −0.021 | −0.021 | −0.021 | −0.021 | −0.021 | −0.021 | −0.021 |

| Conditional Expression No. | Numerical Embodiment 8 | Numerical Embodiment 9 | Numerical Embodiment 10 | Numerical Embodiment 11 | Numerical Embodiment 12 | Numerical Embodiment13 | Numerical Embodiment 14 |
|---|---|---|---|---|---|---|---|
| (1) | 1.001 | 1.000 | 0.969 | 0.969 | 0.969 | 0.960 | 0.969 |
| (2) | −0.1823 | −0.1823 | −0.0001 | 0.0000 | −0.1301 | −0.0071 | −0.0035 |
| (3) | −0.908 | −0.908 | | | −1.002 | −1.193 | |
| (4) | −0.001107 | 0.000380 | −0.000564 | −0.000564 | −0.000564 | −0.000568 | −0.000564 |
| (5) | 4.666 | 2.547 | 81.621 | 168.531 | 0.621 | 8.652 | 11.153 |
| (6) | 3.661 | 3.661 | 12.440 | 9.644 | 0.587 | 13.681 | 3.082 |
| (7) | 16.006 | 7.471 | | | 19.102 | 23.336 | |
| (8) | 1.200 | 1.200 | 1.000 | 1.000 | 0.968 | 0.846 | 1.141 |
| (9) | −0.000805 | −0.002347 | −0.004512 | −0.004842 | −0.002593 | −0.001538 | −0.006099 |
| (10) | 0.253 | 0.005 | 0.025 | 0.025 | 0.025 | 0.025 | 0.024 |
| (11) | −0.010 | −0.018 | −0.021 | −0.021 | −0.021 | −0.021 | −0.021 |

Figure 32:
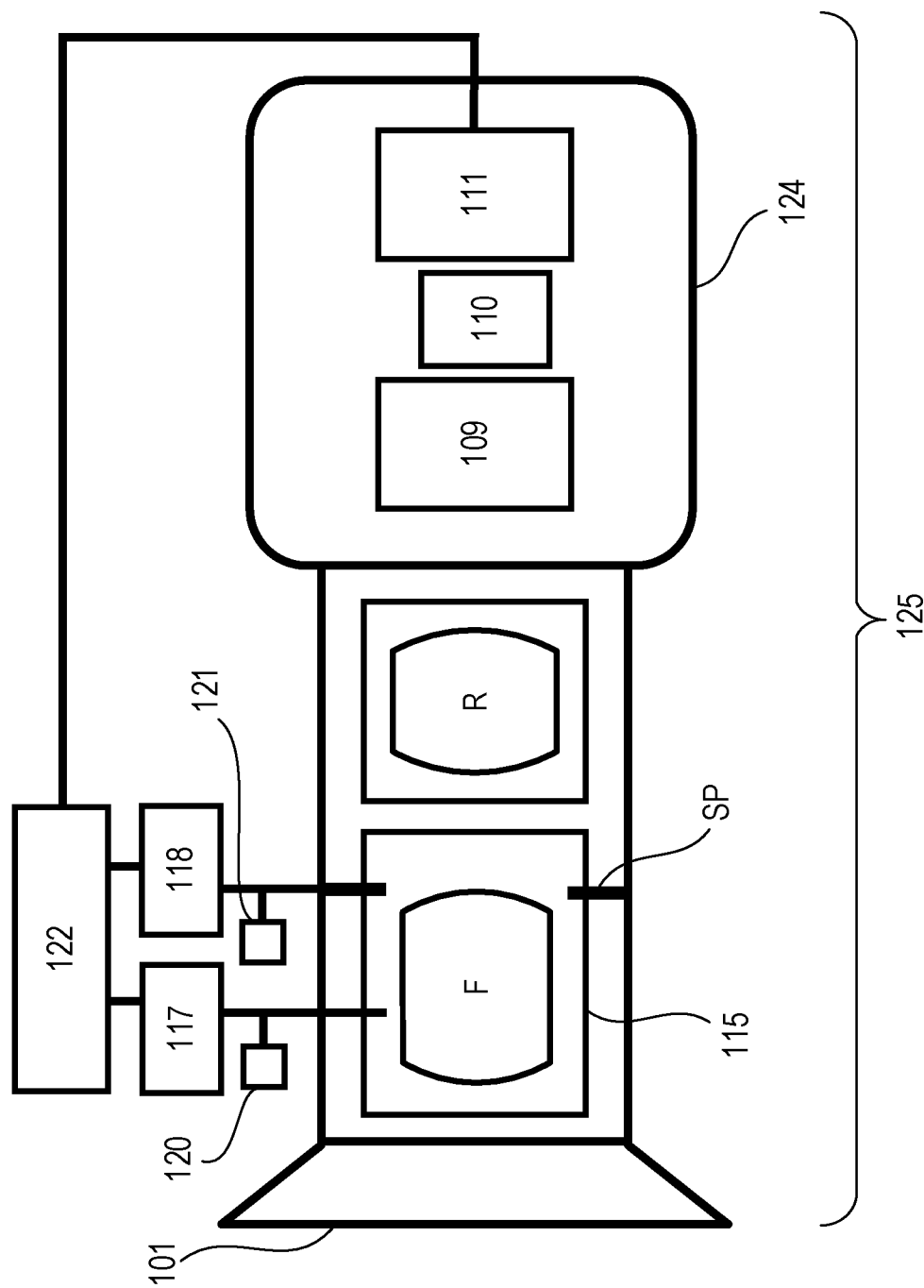
FIG. 32 is a schematic diagram of a main part of an image pickup apparatus according to one embodiment of the present invention.

FIG. 32 is a schematic diagram of an image pickup apparatus (television camera system), which uses a soft focus lens, a converter, or an attachment optical system, in which the soft focus optical system according to each of Embodiments is used. In FIG. 32, a lens apparatus 101 includes the soft focus optical system according to any one of Embodiments 1 to 14. The lens apparatus 101 is attachable/detachable to/from a camera apparatus 124. An image pickup apparatus 125 is formed by attaching the lens apparatus 101 to the camera apparatus 124. The lens apparatus 101 includes a first lens unit F and a soft focus optical system R. The first lens unit F includes a focusing lens unit. An aperture stop SP is located between the first lens unit F and the soft focus optical system R. A drive mechanism 115, for example, a helicoid or a cam, is configured to drive the focusing lens unit in the first lens unit F in an optical axis direction. Motors (drive units) 117 and 118 are configured to electrically drive the drive mechanism 115 and the aperture stop SP. Detectors 120 and 121, for example, an encoder, a potentiometer, or a photo-sensor, are configured to detect the position of the first lens unit F on the optical axis, and the aperture diameter of the aperture stop SP. The camera apparatus 124 includes a glass block 109, which corresponds to an optical filter or a color separating optical system provided within the camera apparatus 124. Further, the camera apparatus 124 includes a solid-state image pickup element (photoelectric conversion element) 110, for example, a charge-coupled device (CCD) sensor or a complementary metal-oxide semiconductor (CMOS) sensor. The solid-state image pickup element 110 is configured to receive an object image formed by the lens apparatus 101. Further, central processing units (CPUs) 111 and 122 are configured to control the driving of the camera apparatus 124 and the lens apparatus 101.

As described above, the soft focus lens according to one embodiment of the present invention is applied to a television camera to realize the image pickup apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-114128, filed Jun. 9, 2017, which is hereby incorporated by reference herein in its entirety.

What is claimed is:

1. A soft focus optical system configured to be arranged on an image side of an image pickup optical system, the soft focus optical system consisting of:
   a negative lens; and
   a positive lens,
   wherein a conditional expression $$0.950 < B < 1.050,$$

is satisfied, where B is a magnification of the soft focus optical system, and
   wherein a conditional expression $$|(2Y)^2/(fn \times fp)| \leq 0.005$$

is satisfied or conditional expressions $$0.005 < |(2Y)^2/(fn \times fp)|; \text{ and}$$

$$fn/fp < -0.750,$$

are satisfied, where fn is a focal length of the negative lens, fp is a focal length of the positive lens, and Y is a maximum image height of the image pickup lens.

2. The soft focus optical system according to claim 1, wherein a conditional expression $$|SA|/(2Y \times Fno) < 4.000 \times 10^{-3},$$

is satisfied, where SA is a spherical aberration amount of the image pickup optical system at 100 percent of ray height with respect to a d-line in an in-focus state at an infinite object distance, and Fno is an F-number of the image pickup lens.

3. The soft focus optical system according to claim 1, wherein the image pickup lens is a fixed focal length lens.

4. The soft focus optical system according to claim 1, wherein in a case where a conditional expression $$|(2Y)^2/(fn \times fp)| \leq 0.005,$$

is satisfied, conditional expressions $$2.5 < |SFn|; \text{ and}$$

$$2.5 < |SFp|,$$

are satisfied, where SFn and SFp are defined by expressions $$SFn = (rn1 + rn2)/(rn1 - rn2); \text{ and}$$

$$SFp = (rp1 + rp2)/(rp1 - rp2),$$

where rp1 is a curvature radius of a surface on an object side of the positive lens, rp2 is a curvature radius of a surface on the image side of the positive lens, rn1 is a curvature radius of a surface on the object side of the negative lens, and rn2 is a curvature radius of a surface on the image side of the negative lens.

5. The soft focus optical system according to claim 1, wherein in a case where a conditional expression of $0.005<|(2Y)^2/(fn \times fp)|$ is satisfied, a surface on an object side of one, disposed on the object side, of the positive lens and the negative lens is convex toward the object side, a surface on the image side of the other, disposed on the image side, of the positive lens and the negative lens is convex toward the object side, and conditional expression $$6.5<|SFnp|$$

is satisfied, here SFnp is defined by an expression $$SFnp=(r1+r4)/(r1-r4),$$

where r1 is a curvature radius of the surface on the object side of the one, and r4 is a curvature radius of the surface on the image side of the other.

6. The soft focus optical system according to claim 1, wherein a conditional expression $$0.740<Nn/Np<1.350,$$

is satisfied, where Nn is a refractive index of a material of the negative lens with respect to a d-line, and Np is a refractive index of a material of the positive lens with respect to the d-line.

7. The soft focus optical system according to claim 1, wherein the negative lens and the positive lens are constituents of a cemented lens.

8. The soft focus optical system according to claim 1, wherein conditional expression $$-7.000 \times 10^{-3}<(SAs-SA)/(2Y \times Fno)<-0.800 \times 10^{-3},$$

is satisfied, where SA is a spherical aberration amount of the image pickup optical system at 100 percent of ray height with respect to a d-line in an in-focus state at an infinite object distance, SAs is a spherical aberration amount of integration of the image pickup optical system and the soft focus optical system at 100 percent of ray height with respect to the d-line in an in-focus state at the infinite object distance.

9. A soft focus lens comprising in order from an object side to an image side:
an image pickup optical system; and
a soft focus optical system,
wherein the soft focus optical system consists of:
a negative lens; and
a positive lens,
wherein a conditional expression $$0.950<B<1.050,$$

is satisfied, where B is a magnification of the soft focus optical system, and wherein a conditional expression $$|(2Y)^2/(fn \times fp)| \leq 0.005$$

is satisfied or conditional expressions $$0.005<|(2Y)^2/(fn \times fp)|; \text{ and}$$

$$fn/fp<-0.750,$$

are satisfied, where fn is a focal length of the negative lens, fp is a focal length of the positive lens, and Y is a maximum image height of the image pickup lens.

10. The soft focus lens according to claim 9, wherein a conditional expression $$0.000<L1/L1d<0.500,$$

is satisfied, where L1 is a distance from a surface closest to the image side of the image pickup optical system to a surface closest to the object side of the soft focus optical system, and L1d is a distance from the surface closest to the image side of the image pickup optical system to an image plane.

11. The soft focus lens according to claim 10, wherein a conditional expression $$-0.033<1/Tk1<-0.009,$$

is satisfied, where Tk1 is a distance from an exit pupil of a lens apparatus consisting of the image pickup optical system to the image plane.

12. A soft focus adapter comprising:
a soft focus optical system; and
a structure attachable to and detachable from an image pickup apparatus at an image side of the image pickup apparatus,
wherein the soft focus optical system consists of:
a negative lens; and
a positive lens,
wherein a conditional expression $$0.950<B<1.050,$$

is satisfied, where B is a magnification of the soft focus optical system, and wherein a conditional expression $$|(2Y)^2/(fn \times fp)| \leq 0.005$$

is satisfied or conditional expressions $$0.005<|(2Y)^2/(fn \times fp)|; \text{ and}$$

$$fn/fp<-0.750,$$

are satisfied, where fn is a focal length of the negative lens, fp is a focal length of the positive lens, and Y is a maximum image height of the image pickup lens.

13. An image pickup apparatus comprising:
a soft focus lens defined in claim 9; and
an image pickup element arranged on an image plane of the soft focus lens.

* * * * *